(12) United States Patent
Wong et al.

(10) Patent No.: US 9,680,310 B2
(45) Date of Patent: Jun. 13, 2017

(54) INTEGRATED IMPLANTABLE TETS HOUSING INCLUDING FINS AND COIL LOOPS

(71) Applicant: Thoratec Corporation, Pleasanton, CA (US)

(72) Inventors: Kenneth Wong, Saratoga, CA (US); George Chao-chih Hsu, San Ramon, CA (US); John Duc Nguyen, San Ramon, CA (US); Carine Hoarau, Lafayette, CA (US); Steven Reichenbach, Pleasanton, CA (US); Kevin Gerald Heppell, Oakland, CA (US)

(73) Assignee: Thoratec Corporation, Pleasanton, CA (US)

( * ) Notice: Subject to any disclaimer, the term of this patent is extended or adjusted under 35 U.S.C. 154(b) by 494 days.

(21) Appl. No.: 14/217,113

(22) Filed: Mar. 17, 2014

(65) Prior Publication Data

US 2014/0265621 A1 Sep. 18, 2014

Related U.S. Application Data

(60) Provisional application No. 61/794,258, filed on Mar. 15, 2013.

(51) Int. Cl.
*H02J 5/00* (2016.01)
*H02J 17/00* (2006.01)
*H02J 7/02* (2016.01)

(52) U.S. Cl.
CPC .............. *H02J 5/005* (2013.01); *H02J 17/00* (2013.01); *H02J 7/025* (2013.01)

(58) Field of Classification Search
None
See application file for complete search history.

(56) References Cited

U.S. PATENT DOCUMENTS

| 4,041,955 A | 8/1977 | Kelly et al. |
| 4,352,960 A | 10/1982 | Dormer et al. |
| 4,561,443 A | 12/1985 | Hogrefe et al. |

(Continued)

FOREIGN PATENT DOCUMENTS

| DE | 202012000166 U1 | 6/2013 |
| DE | 102012201073 A1 | 7/2013 |

(Continued)

OTHER PUBLICATIONS

Development and Implementation of RFID Technology, Ed. Cristina Turcu, Feb. 2009, pp. 28-30, 93-97.

(Continued)

*Primary Examiner* — Jared Fureman
*Assistant Examiner* — Aqeel Bukhari
(74) *Attorney, Agent, or Firm* — Armstrong Teasdale LLP

(57) ABSTRACT

Systems and methods for wireless energy transfer are described. A transmitter unit has a transmitter resonator with a coil that is coupled to a power supply to wirelessly transmit power to a receiver unit. A receiver unit has a receiver resonator with a coil coupled to a device load. The receiver unit can include a ferrite enclosure to prevent transmission of magnetic flux into electronics of the receiver unit, and can include ferrite fins to increase a coupling between the transmitter resonator and the receiver resonator.

24 Claims, 13 Drawing Sheets

(56) References Cited

U.S. PATENT DOCUMENTS

| | | |
|---|---|---|
| 4,561,444 A | 12/1985 | Livingston et al. |
| 4,630,615 A | 12/1986 | Yomtov |
| 4,679,560 A | 7/1987 | Galbraith |
| 4,726,378 A | 2/1988 | Kaplan |
| 4,736,747 A | 4/1988 | Drake |
| 4,924,171 A | 5/1990 | Baba et al. |
| 5,346,458 A | 9/1994 | Affeld |
| 5,350,413 A | 9/1994 | Miller |
| 5,569,156 A | 10/1996 | Mussivand |
| 5,630,836 A | 5/1997 | Prem et al. |
| 5,690,693 A | 11/1997 | Wang et al. |
| 5,702,431 A | 12/1997 | Wang et al. |
| 5,755,748 A | 5/1998 | Borza |
| 5,771,438 A | 6/1998 | Palermo et al. |
| 5,831,248 A | 11/1998 | Hojyo et al. |
| 5,948,006 A | 9/1999 | Mann |
| 6,123,726 A | 9/2000 | Mori et al. |
| 6,149,683 A | 11/2000 | Lancisi et al. |
| 6,212,430 B1 | 4/2001 | Kung |
| 6,296,533 B1 | 10/2001 | Grubbs et al. |
| 6,312,338 B1 | 11/2001 | Sato et al. |
| 6,320,354 B1 | 11/2001 | Sengupta et al. |
| 6,324,431 B1 | 11/2001 | Zarinetchi et al. |
| 6,327,504 B1 | 12/2001 | Dolgin et al. |
| 6,389,318 B1 | 5/2002 | Zarinetchi et al. |
| 6,442,434 B1 | 8/2002 | Zarinetchi et al. |
| 6,451,055 B1 | 9/2002 | Weiss |
| 6,458,164 B1 | 10/2002 | Weiss |
| 6,478,820 B1 | 11/2002 | Weiss |
| 6,553,263 B1 | 4/2003 | Meadows et al. |
| 6,579,315 B1 | 6/2003 | Weiss |
| 6,591,139 B2 | 7/2003 | Loftin et al. |
| 6,605,032 B2 | 8/2003 | Benkowski et al. |
| 6,647,298 B2 | 11/2003 | Abrahamson et al. |
| 6,650,213 B1 | 11/2003 | Sakurai et al. |
| 6,723,039 B2 | 4/2004 | French et al. |
| 6,772,011 B2 | 8/2004 | Dolgin |
| 6,801,807 B2 | 10/2004 | Abrahamson |
| 6,810,289 B1 | 10/2004 | Shaquer |
| 6,850,803 B1 | 2/2005 | Jimenez et al. |
| 6,894,456 B2 | 5/2005 | Tsukamoto et al. |
| 6,895,281 B1 | 5/2005 | Amundson et al. |
| 6,949,065 B2 | 9/2005 | Sporer et al. |
| 6,960,968 B2 | 11/2005 | Odendaal et al. |
| 6,967,621 B1 | 11/2005 | Cadotte, Jr. et al. |
| 6,985,773 B2 | 1/2006 | Von Arx et al. |
| 7,015,769 B2 | 3/2006 | Schulman et al. |
| 7,107,103 B2 | 9/2006 | Schulman et al. |
| 7,126,310 B1 | 10/2006 | Barron |
| 7,225,032 B2 | 5/2007 | Schmeling et al. |
| 7,246,040 B2 | 7/2007 | Borg et al. |
| 7,286,880 B2 | 10/2007 | Olson et al. |
| 7,428,438 B2 | 9/2008 | Parramon et al. |
| 7,471,986 B2 | 12/2008 | Hatlestad |
| 7,496,733 B2 | 2/2009 | Altman et al. |
| 7,505,816 B2 | 3/2009 | Schmeling et al. |
| 7,515,012 B2 | 4/2009 | Schulman et al. |
| 7,522,878 B2 | 4/2009 | Baarman |
| 7,532,901 B1 | 5/2009 | LaFranchise et al. |
| 7,565,187 B1 | 7/2009 | Dynok et al. |
| 7,571,007 B2 | 8/2009 | Erickson et al. |
| 7,574,173 B2 | 8/2009 | Terranova et al. |
| 7,587,241 B2 | 9/2009 | Parramon et al. |
| 7,599,743 B2 | 10/2009 | Hassler et al. |
| 7,650,187 B2 | 1/2010 | Gruber et al. |
| 7,650,192 B2 | 1/2010 | Wahlstrand |
| 7,711,433 B2 | 5/2010 | Davis et al. |
| 7,720,546 B2 | 5/2010 | Ginggen et al. |
| 7,741,734 B2 | 6/2010 | Joannopoulos et al. |
| 7,761,164 B2 | 7/2010 | Verhoef et al. |
| 7,774,069 B2 | 8/2010 | Olson et al. |
| 7,782,190 B1 | 8/2010 | Martin et al. |
| 7,805,200 B2 | 9/2010 | Kast et al. |
| 7,812,481 B2 | 10/2010 | Iisaka et al. |
| 7,818,036 B2 | 10/2010 | Lair et al. |
| 7,818,037 B2 | 10/2010 | Lair et al. |
| 7,825,543 B2 | 11/2010 | Karalis et al. |
| 7,830,114 B2 | 11/2010 | Reed |
| 7,865,245 B2 | 1/2011 | Torgerson et al. |
| 7,872,367 B2 | 1/2011 | Recksiek et al. |
| 7,904,170 B2 | 3/2011 | Harding |
| 7,932,696 B2 | 4/2011 | Peterson |
| 7,962,222 B2 | 6/2011 | He et al. |
| RE42,682 E | 9/2011 | Barreras et al. |
| 8,076,801 B2 | 12/2011 | Karalis et al. |
| 8,081,925 B2 | 12/2011 | Parramon et al. |
| 8,096,954 B2 | 1/2012 | Stahmann et al. |
| 8,140,168 B2 | 3/2012 | Olson et al. |
| 8,150,529 B2 | 4/2012 | Snell et al. |
| 8,165,694 B2 | 4/2012 | Carbanaru et al. |
| 8,185,212 B2 | 5/2012 | Carbunaru et al. |
| 8,193,766 B2 | 6/2012 | Rondoni et al. |
| 8,203,434 B2 | 6/2012 | Yoshida |
| 8,244,367 B2 | 8/2012 | Wahlstrand et al. |
| 8,247,926 B2 | 8/2012 | Issa et al. |
| 8,258,653 B2 | 9/2012 | Kitamura et al. |
| 8,265,770 B2 | 9/2012 | Toy et al. |
| 8,278,784 B2 | 10/2012 | Cook et al. |
| 8,292,052 B2 | 10/2012 | Bohori et al. |
| 8,299,652 B2 | 10/2012 | Sample et al. |
| 8,301,079 B2 | 10/2012 | Baarman |
| 8,319,473 B2 | 11/2012 | Choi et al. |
| 8,362,742 B2 | 1/2013 | Kallmyer |
| 8,373,310 B2 | 2/2013 | Baarman et al. |
| 8,378,522 B2 | 2/2013 | Cook et al. |
| 8,378,523 B2 | 2/2013 | Cook et al. |
| 8,463,395 B2 | 6/2013 | Forsell |
| 8,489,200 B2 | 7/2013 | Zarinetchi et al. |
| 8,551,163 B2 | 10/2013 | Aber et al. |
| 8,562,508 B2 | 10/2013 | Dague et al. |
| 8,581,793 B2 | 11/2013 | Carr |
| 8,587,154 B2 | 11/2013 | Fells et al. |
| 8,620,447 B2 | 12/2013 | D'Ambrosio et al. |
| 8,628,460 B2 | 1/2014 | Yomtov et al. |
| 8,629,578 B2 | 1/2014 | Kurs et al. |
| 8,668,473 B2 | 3/2014 | Larose et al. |
| 8,810,071 B2 | 8/2014 | Sauerlaender et al. |
| 8,884,468 B2 | 11/2014 | Lemmens et al. |
| 8,971,958 B2 | 3/2015 | Frikart et al. |
| 9,002,468 B2 | 4/2015 | Shea et al. |
| 9,106,083 B2 | 8/2015 | Partovi |
| 9,192,704 B2 | 11/2015 | Yomtov et al. |
| 9,515,494 B2 | 12/2016 | Kurs et al. |
| 9,515,495 B2 | 12/2016 | Kurs et al. |
| 2002/0038138 A1 | 3/2002 | Zarinetchi et al. |
| 2002/0087204 A1 | 7/2002 | Kung et al. |
| 2002/0093456 A1 | 7/2002 | Sawamura et al. |
| 2003/0171792 A1 | 9/2003 | Zarinetchi et al. |
| 2004/0138725 A1 | 7/2004 | Forsell |
| 2004/0256146 A1 | 12/2004 | Frericks |
| 2005/0006083 A1 | 1/2005 | Chen et al. |
| 2005/0288743 A1 | 12/2005 | Ahn et al. |
| 2006/0271129 A1 | 11/2006 | Tai et al. |
| 2007/0096686 A1 | 5/2007 | Jimenez et al. |
| 2007/0123948 A1 | 5/2007 | Dal Molin |
| 2007/0142696 A1 | 6/2007 | Crosby et al. |
| 2007/0191706 A1 | 8/2007 | Calderon et al. |
| 2008/0009198 A1 | 1/2008 | Marino |
| 2008/0027293 A1 | 1/2008 | Vodermayer et al. |
| 2008/0100294 A1 | 5/2008 | Rohling et al. |
| 2008/0149736 A1 | 6/2008 | Kim et al. |
| 2008/0167531 A1 | 7/2008 | McDermott |
| 2008/0211320 A1 | 9/2008 | Cook et al. |
| 2009/0018616 A1 | 1/2009 | Quick et al. |
| 2009/0051224 A1 | 2/2009 | Cook et al. |
| 2009/0072628 A1 | 3/2009 | Cook et al. |
| 2009/0081943 A1 | 3/2009 | Dobyns et al. |
| 2009/0174264 A1 | 7/2009 | Onishi et al. |
| 2009/0212736 A1 | 8/2009 | Baarman et al. |
| 2009/0226328 A1 | 9/2009 | Morello |
| 2009/0270679 A1 | 10/2009 | Hoeg et al. |
| 2009/0284220 A1 | 11/2009 | Toncich et al. |
| 2010/0019985 A1 | 1/2010 | Bashyam et al. |
| 2010/0033021 A1 | 2/2010 | Bennett |

(56) References Cited

U.S. PATENT DOCUMENTS

| | | |
|---|---|---|
| 2010/0035453 A1 | 2/2010 | Tronnes et al. |
| 2010/0045114 A1 | 2/2010 | Sample et al. |
| 2010/0063347 A1 | 3/2010 | Yomtov et al. |
| 2010/0066305 A1 | 3/2010 | Takahashi et al. |
| 2010/0069992 A1 | 3/2010 | Aghassian et al. |
| 2010/0109958 A1 | 5/2010 | Haubrich et al. |
| 2010/0114143 A1 | 5/2010 | Albrecht et al. |
| 2010/0122995 A1 | 5/2010 | Thomas et al. |
| 2010/0171368 A1 | 7/2010 | Schatz et al. |
| 2010/0184371 A1 | 7/2010 | Cook et al. |
| 2010/0194334 A1 | 8/2010 | Kirby et al. |
| 2010/0210233 A1 | 8/2010 | Cook et al. |
| 2010/0211134 A1 | 8/2010 | Forsell |
| 2010/0222848 A1 | 9/2010 | Forsell |
| 2010/0222849 A1 | 9/2010 | Forsell |
| 2010/0225174 A1 | 9/2010 | Jiang |
| 2010/0244576 A1 | 9/2010 | Hillan et al. |
| 2010/0256708 A1 | 10/2010 | Thornton et al. |
| 2010/0277121 A1 | 11/2010 | Hall et al. |
| 2010/0308939 A1 | 12/2010 | Kurs |
| 2010/0314946 A1 | 12/2010 | Budde et al. |
| 2010/0331919 A1 | 12/2010 | DiGiore et al. |
| 2011/0025132 A1 | 2/2011 | Sato |
| 2011/0043050 A1 | 2/2011 | Yabe et al. |
| 2011/0046699 A1 | 2/2011 | Mazanec |
| 2011/0057607 A1 | 3/2011 | Carobolante |
| 2011/0101790 A1 | 5/2011 | Budgett |
| 2011/0109263 A1 | 5/2011 | Sakoda et al. |
| 2011/0115431 A1 | 5/2011 | Dunworth et al. |
| 2011/0127848 A1 | 6/2011 | Ryu et al. |
| 2011/0148215 A1 | 6/2011 | Marzetta et al. |
| 2011/0178361 A1 | 7/2011 | Yomtov |
| 2011/0234155 A1* | 9/2011 | Chen .............. A61N 1/3787 320/108 |
| 2011/0241436 A1 | 10/2011 | Furukawa |
| 2011/0245892 A1 | 10/2011 | Kast et al. |
| 2011/0266880 A1 | 11/2011 | Kim et al. |
| 2011/0276110 A1 | 11/2011 | Whitehurst et al. |
| 2011/0278948 A1 | 11/2011 | Forsell |
| 2011/0291489 A1 | 12/2011 | Tsai et al. |
| 2011/0291613 A1 | 12/2011 | Rosik et al. |
| 2011/0295345 A1 | 12/2011 | Wells et al. |
| 2011/0298294 A1 | 12/2011 | Takada et al. |
| 2011/0301667 A1 | 12/2011 | Olson et al. |
| 2011/0313238 A1 | 12/2011 | Reichenbach et al. |
| 2012/0001485 A1 | 1/2012 | Uchida |
| 2012/0032522 A1 | 2/2012 | Schatz et al. |
| 2012/0039102 A1 | 2/2012 | Shinoda |
| 2012/0057322 A1 | 3/2012 | Waffenschmidt |
| 2012/0065458 A1 | 3/2012 | Tol |
| 2012/0080957 A1 | 4/2012 | Cooper et al. |
| 2012/0091951 A1 | 4/2012 | Sohn |
| 2012/0104997 A1 | 5/2012 | Carobolante |
| 2012/0109256 A1 | 5/2012 | Meskins et al. |
| 2012/0119914 A1 | 5/2012 | Uchida |
| 2012/0146575 A1 | 6/2012 | Armstrong et al. |
| 2012/0149229 A1 | 6/2012 | Kearsley et al. |
| 2012/0150259 A1 | 6/2012 | Meskens |
| 2012/0153954 A1 | 6/2012 | Ota et al. |
| 2012/0157753 A1 | 6/2012 | D'Ambrosio |
| 2012/0157754 A1 | 6/2012 | D'Ambrosio |
| 2012/0161539 A1 | 6/2012 | Kim et al. |
| 2012/0164943 A1 | 6/2012 | Bennett |
| 2012/0169132 A1 | 7/2012 | Choudhary et al. |
| 2012/0169133 A1 | 7/2012 | Lisi et al. |
| 2012/0169137 A1 | 7/2012 | Lisi et al. |
| 2012/0169139 A1 | 7/2012 | Kudo |
| 2012/0169278 A1 | 7/2012 | Choi et al. |
| 2012/0175967 A1 | 7/2012 | Dibben et al. |
| 2012/0245649 A1 | 9/2012 | Bohori et al. |
| 2012/0245664 A1 | 9/2012 | Smith et al. |
| 2012/0259398 A1 | 10/2012 | Chen et al. |
| 2012/0274148 A1 | 11/2012 | Sung et al. |
| 2012/0306433 A1 | 12/2012 | Kim et al. |
| 2013/0007949 A1 | 1/2013 | Kurs et al. |
| 2013/0060103 A1 | 3/2013 | Bergida et al. |
| 2013/0119773 A1 | 5/2013 | Davis |
| 2013/0127253 A1 | 5/2013 | Stark et al. |
| 2013/0159956 A1 | 6/2013 | Verghese et al. |
| 2013/0190551 A1 | 7/2013 | Callaway et al. |
| 2013/0241468 A1 | 9/2013 | Moshfeghi |
| 2013/0271088 A1 | 10/2013 | Hwang et al. |
| 2013/0289334 A1 | 10/2013 | Badstibner et al. |
| 2013/0310630 A1 | 11/2013 | Smith et al. |
| 2013/0320773 A1 | 12/2013 | Schatz et al. |
| 2013/0331638 A1 | 12/2013 | Cameron et al. |
| 2014/0005466 A1 | 1/2014 | Crosby et al. |
| 2014/0011447 A1 | 1/2014 | Konanur et al. |
| 2014/0028110 A1 | 1/2014 | Petersen et al. |
| 2014/0028111 A1 | 1/2014 | Hansen et al. |
| 2014/0031606 A1 | 1/2014 | Hansen et al. |
| 2014/0265620 A1 | 9/2014 | Hoarau et al. |
| 2014/0275727 A1 | 9/2014 | Bonde et al. |
| 2015/0229289 A1 | 8/2015 | Suzuki |
| 2015/0326030 A1* | 11/2015 | Malpas .............. H02J 17/00 307/104 |
| 2016/0218432 A1 | 7/2016 | Pope et al. |
| 2016/0250484 A1 | 9/2016 | Nguyen et al. |
| 2016/0254703 A1 | 9/2016 | Hansen |
| 2016/0254704 A1 | 9/2016 | Hansen et al. |

FOREIGN PATENT DOCUMENTS

| | | |
|---|---|---|
| EP | 1513241 A1 | 3/2005 |
| JP | H03109063 A | 5/1991 |
| JP | 11-506646 | 6/1999 |
| JP | 2013094456 A | 5/2013 |
| JP | 2013161640 A | 8/2013 |
| JP | 2014160611 A | 9/2014 |
| KR | 1020020089605 | 11/2002 |
| KR | 1020120007296 | 1/2012 |
| KR | 1020120077448 | 7/2012 |
| WO | 0001442 A2 | 1/2000 |
| WO | WO00/74747 A1 | 12/2000 |
| WO | WO01/37926 A1 | 5/2001 |
| WO | WO2005/106901 A2 | 11/2005 |
| WO | 2007053881 A1 | 5/2007 |
| WO | WO2008/066941 A2 | 6/2008 |
| WO | WO2009/018271 A1 | 2/2009 |
| WO | WO2009/021220 A1 | 2/2009 |
| WO | WO2009/023905 A1 | 2/2009 |
| WO | WO2009/042977 A1 | 4/2009 |
| WO | WO2010/030378 A1 | 3/2010 |
| WO | WO2010/089354 A2 | 8/2010 |
| WO | 2011081626 A1 | 7/2011 |
| WO | WO2011/113934 A1 | 9/2011 |
| WO | WO2012/002063 A1 | 1/2012 |
| WO | WO2012/056365 A2 | 5/2012 |
| WO | WO2012/087807 A2 | 6/2012 |
| WO | WO2012/087811 A2 | 6/2012 |
| WO | WO2012/087816 A2 | 6/2012 |
| WO | WO2012/087819 A2 | 6/2012 |
| WO | 2012099965 A2 | 7/2012 |
| WO | WO2012/141752 A2 | 10/2012 |
| WO | 2013110602 A1 | 8/2013 |
| WO | WO2013/138451 A1 | 9/2013 |
| WO | WO2014/039673 A1 | 3/2014 |

OTHER PUBLICATIONS

Merli, Francesco, et al., "Design, Realization and Measurements of a Miniature Antenna for Implantable Wireless Communication Systems", IEEE Transaction on Antennas and Propagation, vol. 59, No. 10, Oct. 2011, pp. 3544-3555.

Merli, Francesco, et al.,"The Effect of Insulating Layers on the Performance of Implanted Antennas", IEEE Transaction on Antennas and Propagation, vol. 59, No. 1, Jan. 2011, pp. 21-31.

Abadia, Javier, et al., 3D-Spiral Small Antenna Design and Realization for Biomdical Telemetry in the MICS Band. Radioengineering, vol. 18, No. 4, Dec. 2009, pp. 359-367.

Bonde et al.; Promise of unrestricted mobility with innovative, portable wireless powering of a mechanical circulatory assist

(56) References Cited

OTHER PUBLICATIONS device; American Association for Thoracic Surgery; © 2012; 2 pgs.; retrieved Mar. 12, 2014 from the internet: http://aats.org/annualmeeting/Abstracts/2012/T8.cgi.

Chargepoint, Inc.; -chargepoin+®; product brochure; 4 pgs.; © 2014; retrieved Mar. 12, 2014 from the internet: http://www.chargepoint.com/network/.

Dixon, Jr.; Eddy current losses in transformer windings and circuit wiring; Unitrode Corp. Seminar Manual (SEM600); Watertown, MA; 12 pgs.; 1988 (year of pub. sufficiently earlier than effective US filing date and any foreign priority date).

Evatran; PluglessTM Level 2 EV Charging System (3.3kW); product brochure; 7 pgs.; retrieved Mar. 12, 2014 from the internet: http://www.pluglesspower.com/tech-specs/.

Ferret, B.; Electric vehicles get big boost!; Renewable Energy World; 3 pgs.; Jul. 30, 2012; retrieved Jul. 30, 2012 from the internet: http://www.renewableenergyworld.com/rea/blog/post/2012/07/.

Motavalli, Jim; WiTricity Takes Its Car-Charging Technology Out for a Road Test; New York Times; 3 pgs.; Jul. 25, 2012; retrieved Mar. 12, 2014 from the internet: http://wheels.blogs.nytimes.com/2012/07/25/witricity-takes-its-car-charging-technology-out-for-a-road-test/.

Petersen et al.; U.S. Appl. No. 14/414,708 entitled "Wireless Battery Charging," filed Jan. 14, 2015.

Petersen, E.; U.S. Appl. No. 14/414,820 entitled "Variable Capacitor for Resonant Power Transfer Systems," filed Jan. 14, 2015.

Petersen, E.; U.S. Appl. No. 14/414,823 entitled "Resonant Power Transfer System and Method of Estimating System State," filed Jan. 14, 2015.

Hansen, J.; U.S. Appl. No. 14/414,832 entitled "Resonant Power Transfer Systems With Protective Algorithm," filed Jan. 14, 2015.

Petersen et al.; U.S. Appl. No. 14/414,840 entitled "Computer Modeling for Resonant Power Transfer Systems," filed Jan. 14, 2015.

Hansen, J.; U.S. Appl. No. 14/414,842 entitled "Resonant Power Transmission Coils and Systems," filed Jan. 14, 2015.

Notification of Transmittal of the International Search Report and the Written Opinion of the International Searching Authority for PCT Application No. PCT/US2015/051474, mailed Dec. 30, 2015.

\* cited by examiner $$k_c \approx \frac{A_2}{A_1}$$

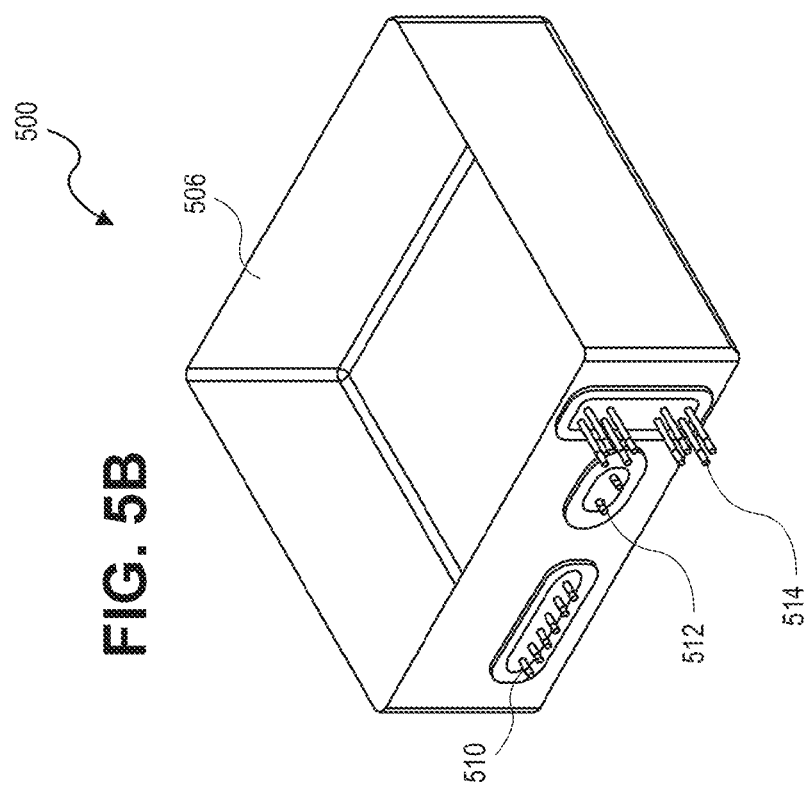
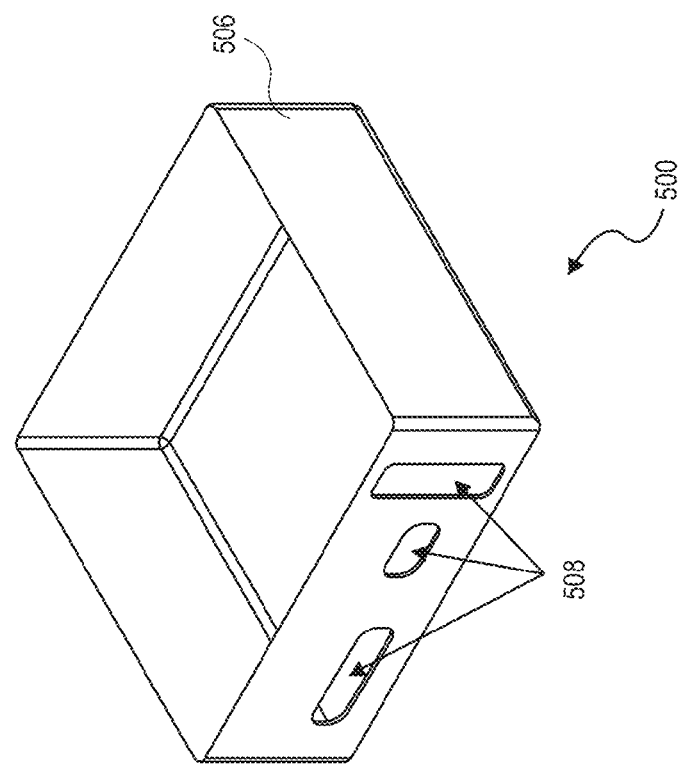

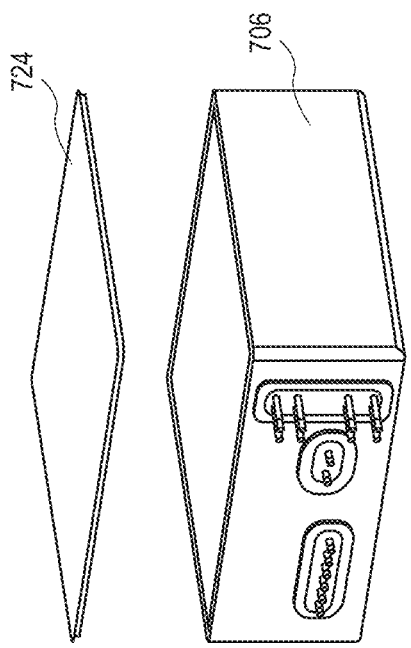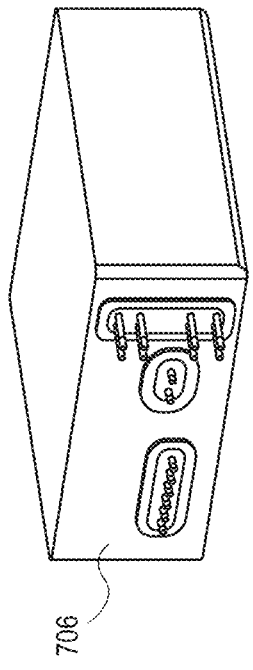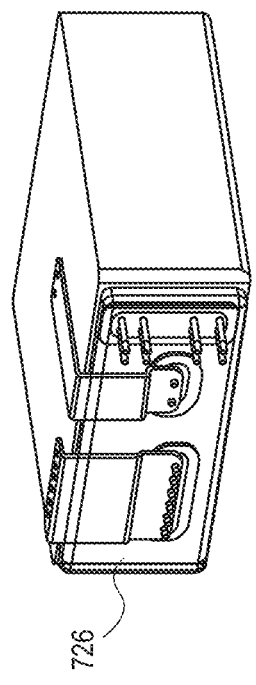

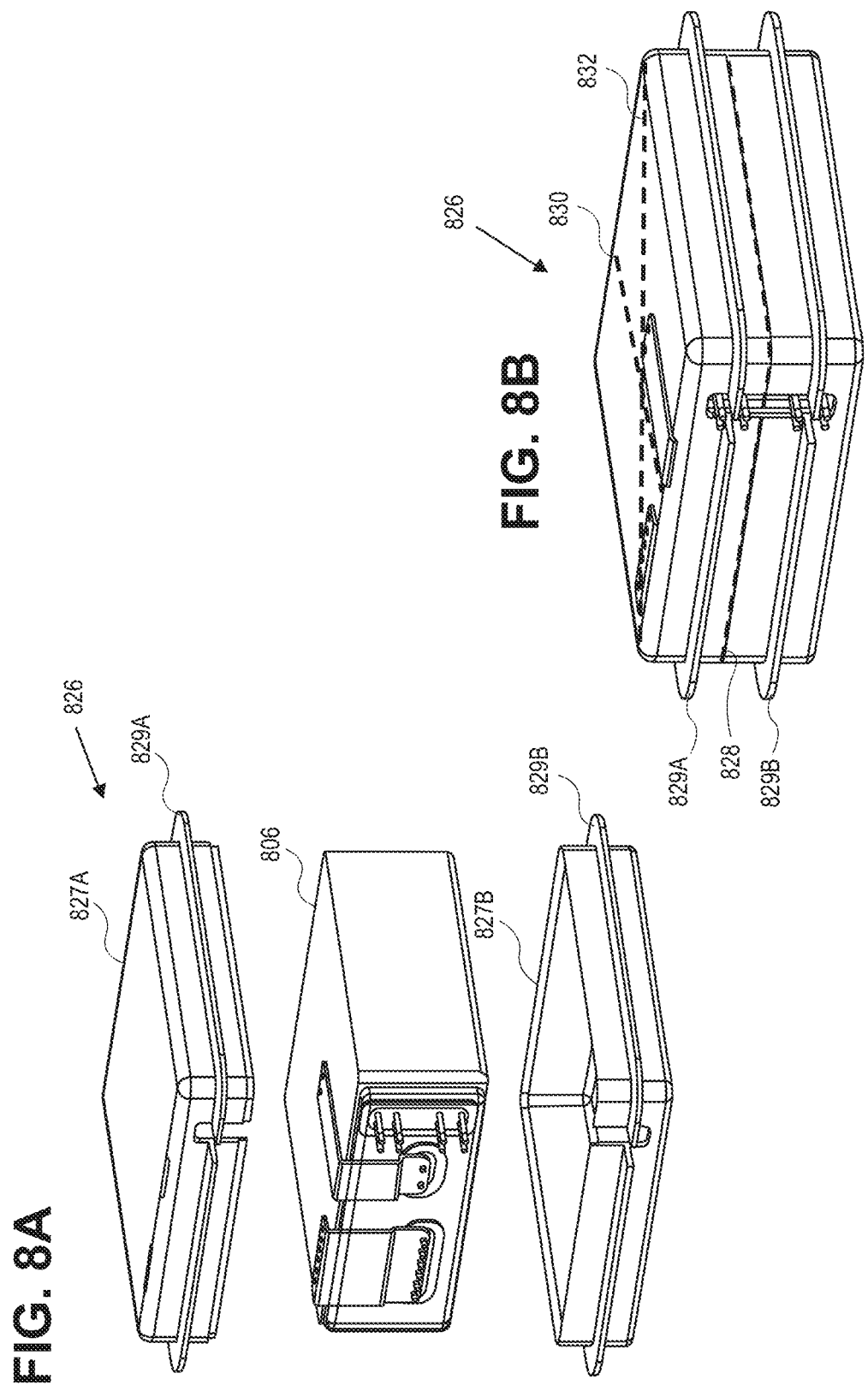

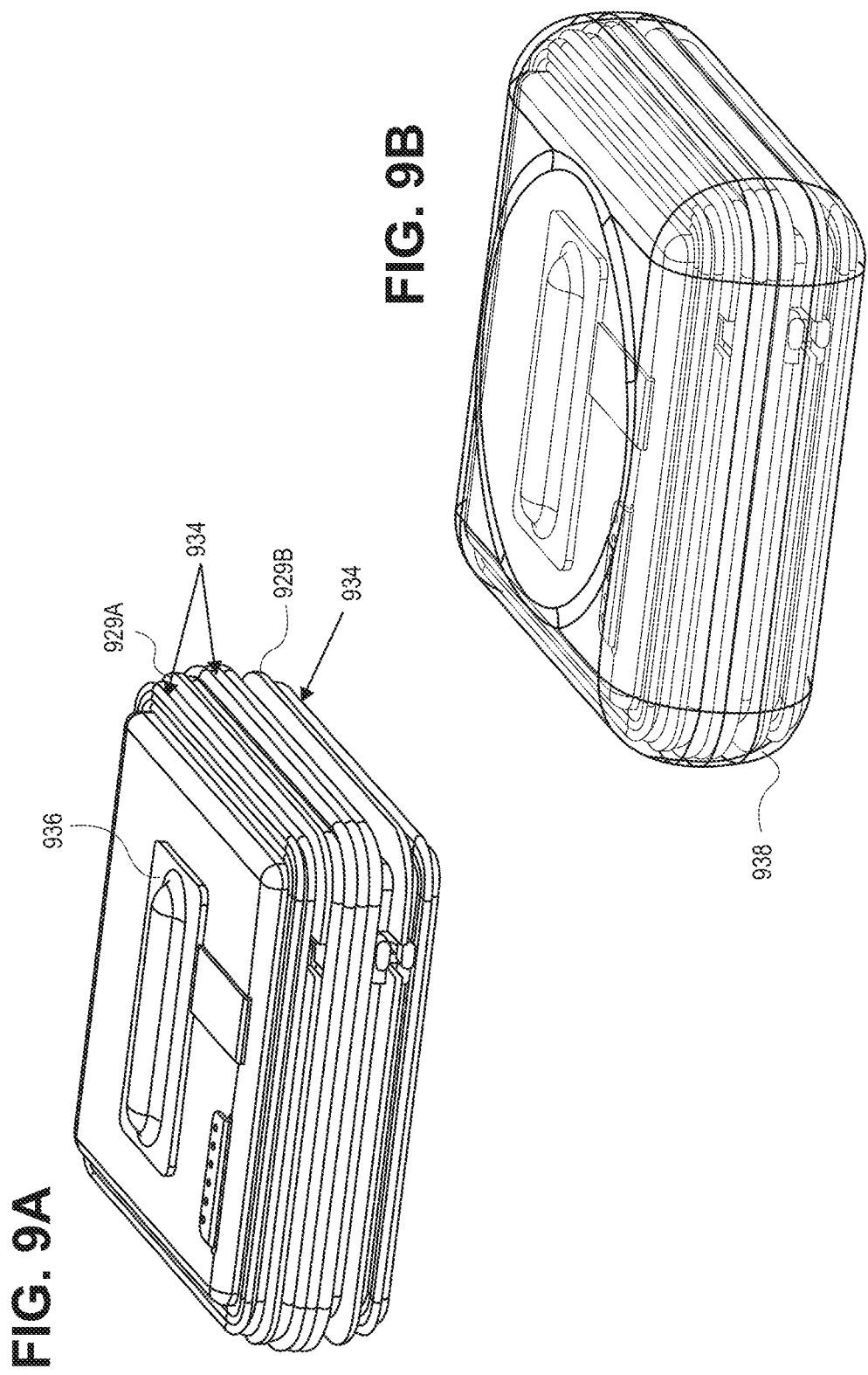

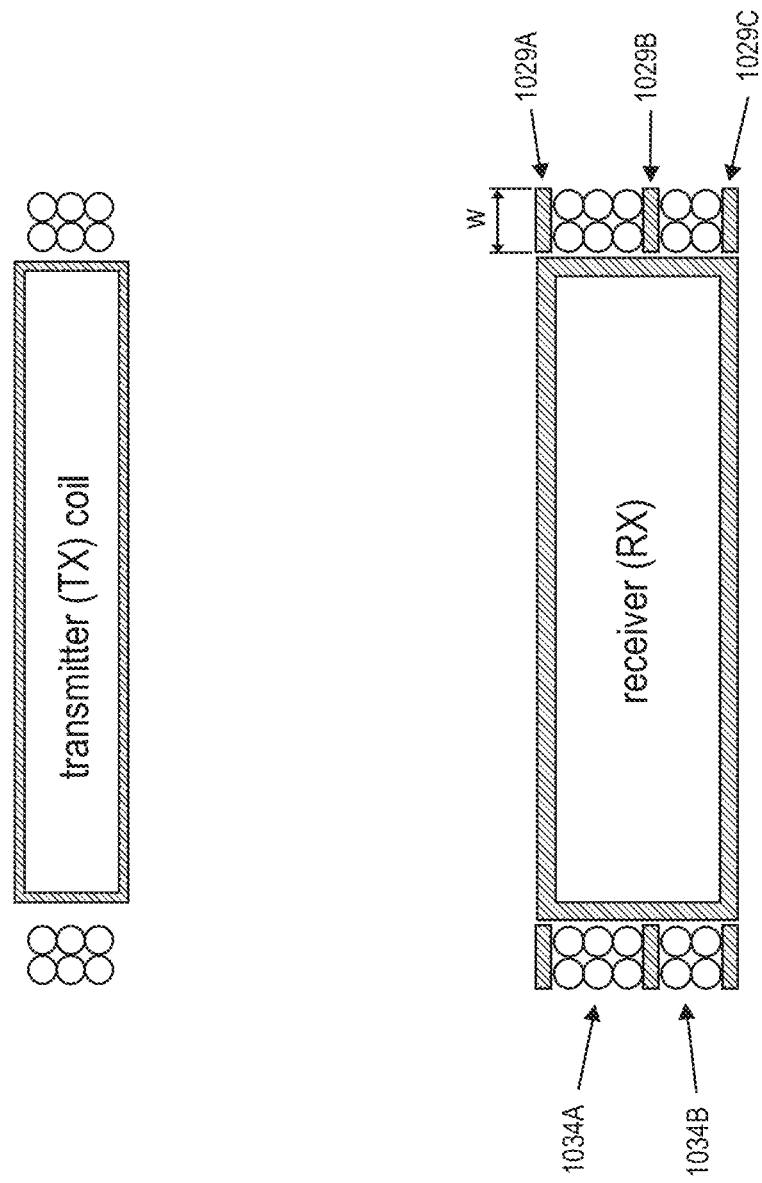

INTEGRATED IMPLANTABLE TETS HOUSING INCLUDING FINS AND COIL LOOPS

CROSS-REFERENCE TO RELATED APPLICATIONS

This application claims the benefit of U.S. Provisional Patent Application No. 61/794,258, filed on Mar. 15, 2013, titled "Integrated Implantable TETS Housing Including Fins and Coil Loops", the contents of which are incorporated by reference herein.

INCORPORATION BY REFERENCE

All publications and patent applications mentioned in this specification are herein incorporated by reference to the same extent as if each individual publication or patent application was specifically and individually indicated to be incorporated by reference.

FIELD

The field relates generally to resonant wireless power transfer systems, and more specifically to implantable resonant wireless power transfer systems.

BACKGROUND

Many implantable medical devices require electrical systems to power the implant. Typically, this is achieved using percutaneous wiring to connect a power source to the implant.

More recently, there has been development into powering an implanted device wirelessly with a Transcutaneous Energy Transfer (TET) system, e.g., through an oscillating magnetic field. For a TET system to be useful, electrical energy storage and processing must be provided when external power is interrupted or not available. This electrical energy processing and storage can be implemented with solid-state electronics and a battery.

Typically, implantable medical devices, such as implanted sensors, require very little power to operate. With such low power levels (on the order of milliwatts), power transfer levels and efficiency can be lower. With higher power devices (e.g. on the order of watts and up to 15 W or more), efficient transfer of wireless power is extremely important. Additionally, positions within the body are limited that can accommodate larger implanted devices, some of which are deep below the skin surface. These implant locations require additional attention to position and orientation of both the transmit and receive coils, as well as techniques to improve and maximize transfer efficiency.

Previous TET systems for implantable medical devices required the implanted receiver coil to be positioned just under the skin, and typically include a mechanical feature to align the receive and transmit coils and keep them together. By implanting these devices directly under the skin, the size and power requirements of these implanted devices is limited if they are to be powered by a TET system.

SUMMARY OF THE DISCLOSURE

An implantable TET receiver unit is provided, comprising an internal housing, an energy source disposed in the internal housing, a controller disposed in the internal housing, the controller configured to control operation of the TET receiver, a ferrite housing disposed around the internal housing, the ferrite housing configured to reduce an amount of magnetic flux that reaches the internal housing, and at least one wire coil wrapped around the ferrite housing and electrically coupled to the controller, the at least one wire coil configured to receive wireless energy from an external power transmitter.

In one embodiment, the ferrite housing comprises two ferrite halves machined out of solid pieces of ferrite. In some embodiments, the ferrite housing comprises a plurality of ferrite tiles.

In one embodiment, the receiver unit further comprises at least one ferrite fin extending from the ferrite housing and positioned next to the at least one wire coil. In one embodiment, the at least one ferrite fin extends around at least a portion of a perimeter of the ferrite enclosure. In another embodiment, the at least one ferrite fin extends around a perimeter of the ferrite enclosure.

In some embodiments, the at least one wire coil further comprises at least one exciter coil and at least one resonator coil.

In some embodiments, the receiver unit further comprises a first ferrite fin extending from the ferrite enclosure and positioned between the at least one resonator coil and an external wireless power transmitter, and second ferrite fin extending from the ferrite enclosure and positioned between the resonator coil and the exciter coil, and a third ferrite fin extending from the ferrite enclosure and positioned on an opposite side of the exciter coil from the second ferrite fin.

In one embodiment, the at least one ferrite fin is configured to increase a coupling between the at least one wire coil and an external wireless power transmitter. In another embodiment, the at least one ferrite fin is configured to decrease a coupling between a resonator coil and an exciter coil of the at least one wire coil.

In some embodiments, a ferrite gap between the ferrite housing occurs along small sides of the internal housing. In one embodiment, a ferrite gap between the ferrite housing occurs along large sides of the internal housing.

A system for wireless energy transfer is also provided, comprising a transmitter unit comprising a transmitter resonator coil coupled to a power supply and configured to transmit wireless energy, and a receiver unit comprising an internal housing, an energy source disposed in the internal housing, a controller disposed in the internal housing, the controller configured to control operation of the TET receiver, a ferrite housing disposed around the internal housing, the ferrite housing configured to reduce an amount of magnetic flux that reaches the internal housing, and at least one wire coil wrapped around the ferrite housing and electrically coupled to the controller, the at least one wire coil configured to receive wireless energy from the transmitter unit.

In some embodiments, the system further comprises at least one ferrite fin extending from the ferrite housing and positioned next to the at least one wire coil. In one embodiment, the at least one ferrite fin extends around a perimeter of the ferrite enclosure.

In other embodiments, the at least one wire coil further comprises at least one exciter coil and at least one resonator coil.

In some embodiments, the at least one ferrite fin is configured to increase a coupling between the at least one wire coil and the transmitter unit.

In another embodiment, the at least one ferrite fin is configured to decrease a coupling between a resonator coil and an exciter coil of the at least one wire coil.

An implantable TET receiver unit is also provided, comprising an internal housing, an energy source disposed in the internal housing, a controller disposed in the internal housing, the controller configured to control operation of the TET receiver, and a coil structure sized and configured to be placed around the internal housing, the coil structure including at least one wire coil configured to receive wireless energy from an external power transmitter, the coil structure further including at least one ferrite strip disposed near the at least one wire coil and configured to increase a coupling between the at least one coil structure and the external power transmitter.

A method of transmitting and receiving wireless energy is provided, comprising transmitting wireless energy from a transmitter coil into a patient, receiving the wireless energy with a receiver unit implanted in the patient, and preventing magnetic flux from interfering with electronics of the receiver unit with a ferrite enclosure that surrounds the receiver unit.

A method of transmitting and receiving wireless energy is also provided, comprising transmitting wireless energy from a transmitter coil into a patient, receiving the wireless energy with a receiver unit implanted in the patient, and increasing a coupling between the transmitter coil and the receiver unit with a ferrite fin that surrounds the receiver unit and is disposed near a receiver coil of the receiver unit.

In some embodiments, the receiver unit comprises an integrated antenna disposed on or near the internal housing and electrically coupled to the controller. In one embodiment, the integrated antenna is formed on a wall of the ferrite housing.

In another embodiment, the receiver unit further comprises a polymer encapsulating the ferrite housing, the internal housing, and the integrated antenna.

BRIEF DESCRIPTION OF THE DRAWINGS

The novel features of the invention are set forth with particularity in the claims that follow. A better understanding of the features and advantages of the present invention will be obtained by reference to the following detailed description that sets forth illustrative embodiments, in which the principles of the invention are utilized, and the accompanying drawings of which:

FIGS. 5A-5B illustrate an internal enclosure of the TET receiver unit.

FIGS. 7A-7C show the internal enclosure hermetically sealed.

FIGS. 8A-8D illustrate a clamshell ferrite enclosure surrounding the internal enclosure.

FIGS. 9A-9C illustrate the completed TET receiver unit with resonator coils and a polymer coating.

FIG. 10 illustrates one embodiment of a TET receiver unit.

DETAILED DESCRIPTION

Figure 1:
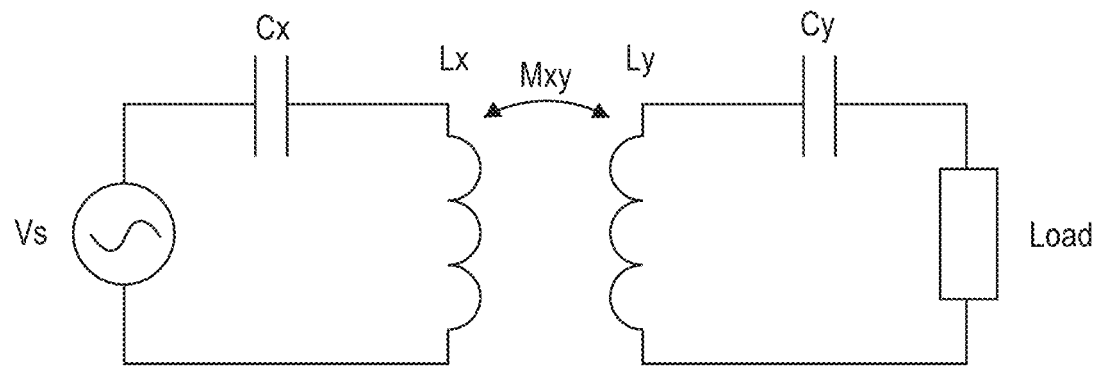
FIG. 1 illustrates a basic wireless power transfer system.

In the description that follows, like components have been given the same reference numerals, regardless of whether they are shown in different embodiments. To illustrate an embodiment(s) of the present disclosure in a clear and concise manner, the drawings may not necessarily be to scale and certain features may be shown in somewhat schematic form. Features that are described and/or illustrated with respect to one embodiment may be used in the same way or in a similar way in one or more other embodiments and/or in combination with or instead of the features of the other embodiments.

Various aspects of the invention are similar to those described in International Patent Pub. No. WO2012045050; U.S. Pat. Nos. 8,667,452; 8,669,676; 8,569,914; 8,627,447; 8,489,200; 8,140,168; 7,865,245; 7,774,069; 7,711,433; 7,650,187; 7,571,007; 7,741,734; 7,825,543; 6,591,139; 6,553,263; and 5,350,413; and U.S. Pub. Nos. 2013/0320773; 2013/0127253; 2010/0308939; 2008/027293; and 2010/0102639, the entire contents of which patents and applications are incorporated herein for all purposes.

Wireless Power Transmission System

Power may be transmitted wirelessly by magnetic induction. In various embodiments, the transmitter and receiver are closely coupled.

In some cases "closely coupled" or "close coupling" refers to a system that requires the coils to be very near each other in order to operate. In some cases "loosely coupled" or "loose coupling" refers to a system configured to operate when the coils have a significant spatial and/or axial separation, and in some cases up to distance equal to or less than the diameter of the larger of the coils. In some cases, "loosely coupled" or "loose coupling" refers a system that is relatively insensitive to changes in physical separation and/or orientation of the receiver and transmitter. In some cases, a loosely coupled system is a highly resonant wireless energy transfer system.

In various embodiments, the transmitter and receiver are non-resonant coils. For example, a change in current in one coil induces a changing magnetic field. The second coil within the magnetic field picks up the magnetic flux, which in turn induces a current in the second coil. An example of a closely coupled system with non-resonant coils is described in International Pub. No. WO2000/074747, incorporated herein for all purposes by reference. A conventional transformer is another example of a closely coupled, non-resonant system. In various embodiments, the transmitter and receiver are resonant coils. For example, one or both of the coils is connected to a tuning capacitor or other means for controlling the frequency in the respective coil. An example of closely coupled system with resonant coils is described in International Pub. Nos. WO2001/037926; WO2012/087807; WO2012/087811; WO2012/087816; WO2012/087819; WO2010/030378; and WO2012/056365, and U.S. Pub. No. 2003/0171792, incorporated herein for all purposes by reference.

In various embodiments, the transmitter and receiver are loosely coupled. For example, the transmitter can resonate to propagate magnetic flux that is picked up by the receiver at relatively great distances. In some cases energy can be transmitted over 3 cm, over 5 cm, over 7 cm, or over 10 cm. In some cases energy can be transmitted over several meters. In some cases energy can be transmitted to a deep body implant. In a loosely coupled system power transfer may not necessarily depend on a critical distance. Rather, the system may be able to accommodate changes to the coupling coefficient between the transmitter and receiver. An example of a loosely coupled system is described in International Pub. No. WO2012/045050, incorporated herein for all purposes by reference.

In various embodiments, the system is able to accommodate ongoing changes to the coupling coefficient between the transmitter and receiver during operation. In the case of an implantable device receiving wireless energy, for example, the relative orientation of the transmitter and receiver is constantly changing. Indeed, sometimes the components can vibrate or move at a rapid pace, which presents challenges to conventional highly-resonant, loosely-coupled systems.

Power may be transmitted wirelessly by radiating energy. In various embodiments, the system comprises antennas. The antennas may be resonant or non-resonant. For example, non-resonant antennas may radiate electromagnetic waves to create a field. The field can be near field or far field. The field can be directional. Generally far field has greater range but a lower power transfer rate. An example of such a system for radiating energy with resonators is described in International Pub. No. WO2010/089354, incorporated herein for all purposes by reference. An example of such a non-resonant system is described in International Pub. No. WO2009/018271, incorporated herein for all purposes by reference. Instead of antenna, the system may comprise a high energy light source such as a laser. The system can be configured so photons carry electromagnetic energy in a spatially restricted, direct, coherent path from a transmission point to a receiving point. An example of such a system is described in International Pub. No. WO2010/089354, incorporated herein for all purposes by reference.

Power may also be transmitted by taking advantage of the material or medium through which the energy passes. For example, volume conduction involves transmitting electrical energy through tissue between a transmitting point and a receiving point. An example of such a system is described in International Pub. No. WO2008/066941, incorporated herein for all purposes by reference.

Power may also be transferred using a capacitor charging technique. The system can be resonant or non-resonant. Exemplars of capacitor charging for wireless energy transfer are described in International Pub. No. WO2012/056365, incorporated herein for all purposes by reference.

The system in accordance with various aspects of the invention will now be described in connection with a system for wireless energy transfer by magnetic induction. The exemplary system utilizes resonant power transfer. The system works by transmitting power between the two inductively coupled coils. In contrast to a transformer, however, the exemplary coils are not coupled together closely. A transformer generally requires the coils to be aligned and positioned directly adjacent each other. The exemplary system accommodates looser coupling of the coils.

While described in terms of one receiver coil and one transmitter coil, one will appreciate from the description herein that the system may use two or more receiver coils and two or more transmitter coils. For example, the transmitter may be configured with two coils—a first coil to resonate flux and a second coil to excite the first coil. In various embodiments, the system uses a plurality of coils with at least one of the coils configured as a repeater. One will further appreciate from the description herein that usage of "resonator" and "coil" may be used somewhat interchangeably. In various respects, "resonator" refers to a coil and a capacitor connected together. In various respects, "transmitter" and "receiver" refer to coils.

In accordance with various embodiments of this disclosure, the system comprises one or more transmitters configured to transmit power wirelessly to one or more receivers. In various embodiments, the system includes a transmitter and more than one receiver in a multiplexed arrangement. A frequency generator may be electrically coupled to the transmitter to drive the transmitter to transmit power at a particular frequency or range of frequencies. The frequency generator can include a voltage controlled oscillator and one or more switchable arrays of capacitors, a voltage controlled oscillator and one or more varactors, a phase-locked-loop, a direct digital synthesizer, or combinations thereof. The transmitter can be configured to transmit power at multiple frequencies simultaneously. The frequency generator can include two or more phase-locked-loops electrically coupled to a common reference oscillator, two or more independent voltage controlled oscillators, or combinations thereof. The transmitter can be arranged to simultaneously delivery power to multiple receivers at a common frequency.

In various embodiments, the transmitter is configured to transmit a low power signal at a particular frequency. The transmitter may transmit the low power signal for a particular time and/or interval. In various embodiments, the transmitter is configured to transmit a high power signal wirelessly at a particular frequency. The transmitter may transmit the high power signal for a particular time and/or interval.

In various embodiments, the receiver includes a frequency selection mechanism electrically coupled to the receiver coil and arranged to allow the resonator to change a frequency or a range of frequencies that the receiver can receive. The frequency selection mechanism can include a switchable array of discrete capacitors, a variable capacitance, one or more inductors electrically coupled to the receiving antenna, additional turns of a coil of the receiving antenna, or combinations thereof. An example of a suitable switching mechanism is a field effect transistor (FET). FETs can be advantage because of their low power losses.

In general, most of the flux from the transmitter coil does not reach the receiver coil. The amount of flux generated by the transmitter coil that reaches the receiver coil is described by "k" and referred to as the "coupling coefficient."

In various embodiments, the system is configured to maintain a value of k in the range of between about 0.2 to about 0.01. In various embodiments, the system is configured to maintain a value of k of at least 0.01, at least 0.02, at least 0.03, at least 0.04, or at least 0.05. Even though the coupling coefficient (k) may be small, the exemplary system provides adequate, useful energy transfer through strong coupling and other energy transfer efficiencies. In one example, the system uses highly resonant structures to overcome the small coupling coefficient.

In various embodiments, the coils are physically separated. In various embodiments, the separation is greater than a thickness of the receiver coil. In various embodiments, the separation distance is equal to or less than the diameter of the larger of the receiver and transmitter coil.

Because most of the flux does not reach the receiver, the transmitter coil must generate a much larger field than what is coupled to the receiver. In various embodiments, this is accomplished by configuring the transmitter with a large number of amp-turns in the coil.

Since only the flux coupled to the receiver gets coupled to a real load, most of the energy in the field is reactive. The current in the coil can be sustained with a capacitor connected to the coil to create a resonator. The power source thus only needs to supply the energy absorbed by the receiver. The resonant capacitor maintains the excess flux that is not coupled to the receiver.

In various embodiments, the impedance of the receiver is matched to the transmitter. This allows efficient transfer of energy out of the receiver. In this case the receiver coil may not need to have a resonant capacitor.

Turning now to FIG. 1, a simplified circuit for wireless energy transmission is shown. The exemplary system shows a series connection, but the system can be connected as either series or parallel on either the transmitter or receiver side.

The exemplary transmitter includes a coil Lx connected to a power source Vs by a capacitor Cx. The exemplary receiver includes a coil Ly connected to a load by a capacitor Cy. Capacitor Cx may be configured to make Lx resonate at a desired frequency. Capacitance Cx of the transmitter coil may be defined by its geometry. Inductors Lx and Ly are connected by coupling coefficient k. Mxy is the mutual inductance between the two coils. The mutual inductance, Mxy, is related to coupling coefficient, k.

$$Mxy = k\sqrt{Lx \cdot Ly}$$

In the exemplary system the power source Vs is in series with the transmitter coil Lx so it may have to carry all the reactive current. This puts a larger burden on the current rating of the power source and any resistance in the source will add to losses.

The exemplary system includes a receiver configured to receive energy wirelessly transmitted by the transmitter. The exemplary receiver is connected to a load. The receiver and load may be connected electrically with a controllable switch.

In various embodiments, the receiver includes a circuit element configured to be connected or disconnected from the receiver coil by an electronically controllable switch. The electrical coupling can include both a serial and parallel arrangement. The circuit element can include a resistor, capacitor, inductor, lengths of an antenna structure, or combinations thereof. The system can be configured such that power is transmitted by the transmitter and can be received by the receiver in predetermined time increments.

In various embodiments, the transmitter coil and/or the receiver coil is a substantially two-dimensional structure. In various embodiments, the transmitter coil may be coupled to a transmitter impedance-matching structure. Similarly, the receiver coil may be coupled to a receiver impedance-matching structure. Examples of suitable impedance-matching structures include, but are not limited to, a coil, a loop, a transformer, and/or any impedance-matching network. An impedance-matching network may include inductors or capacitors configured to connect a signal source to the resonator structure.

In various embodiments, the transmitter is controlled by a controller (not shown) and driving circuit. The controller and/or driving circuit may include a directional coupler, a signal generator, and/or an amplifier. The controller may be configured to adjust the transmitter frequency or amplifier gain to compensate for changes to the coupling between the receiver and transmitter.

In various embodiments, the transmitter coil is connected to an impedance-matched coil loop. The loop is connected to a power source and is configured to excite the transmitter coil. The first coil loop may have finite output impedance. A signal generator output may be amplified and fed to the transmitter coil. In use power is transferred magnetically between the first coil loop and the main transmitter coil, which in turns transmits flux to the receiver. Energy received by the receiver coil is delivered by Ohmic connection to the load.

One of the challenges to a practical circuit is how to get energy in and out of the resonators. Simply putting the power source and load in series or parallel with the resonators is difficult because of the voltage and current required. In various embodiments, the system is configured to achieve an approximate energy balance by analyzing the system characteristics, estimating voltages and currents involved, and controlling circuit elements to deliver the power needed by the receiver.

In an exemplary embodiment, the system load power, $P_L$, is assumed to be 15 Watts and the operating frequency of the system, f, is 250 kHz. Then, for each cycle the load removes a certain amount of energy from the resonance:

$$e_L = \frac{P_L}{f} = 60 \mu J \text{ Energy the load removes in one cycle}$$

It has been found that the energy in the receiver resonance is typically several times larger than the energy removed by the load for operative, implantable medical devices. In various embodiments, the system assumes a ratio 7:1 for energy at the receiver versus the load removed. Under this assumption, the instantaneous energy in the exemplary receiver resonance is 420 µJ.

The exemplary circuit was analyzed and the self inductance of the receiver coil was found to be 60 uH. From the energy and the inductance, the voltage and current in the resonator could be calculated.

$$e_y = \frac{1}{2} L i^2$$

$$i_y = \sqrt{\frac{2 e_y}{L}} = 3.74 A \text{ peak}$$

$$v_y = \omega L_y i_y = 352 V \text{ peak}$$

The voltage and current can be traded off against each other. The inductor may couple the same amount of flux regardless of the number of turns. The Amp-turns of the coil needs to stay the same in this example, so more turns means the current is reduced. The coil voltage, however, will need to increase. Likewise, the voltage can be reduced at the expense of a higher current. The transmitter coil needs to have much more flux. The transmitter flux is related to the receiver flux by the coupling coefficient. Accordingly, the energy in the field from the transmitter coil is scaled by k.

$$e_x = \frac{e_y}{k}$$

Given that k is 0.05:

$$e_x = \frac{420 \mu J}{0.05} = 8.4 mJ$$

For the same circuit the self inductance of the transmitter coil was 146 uH as mentioned above. This results in:

$$i_x = \sqrt{\frac{2 e_x}{L}} = 10.7 A \text{ peak}$$

$$v_x = \omega L_x i_x = 2460 V \text{ peak}$$

From this example one can appreciate the competing factors and how to balance voltage, current, and inductance to suit the circumstance and achieve the desired outcome.

Like the receiver, the voltage and current can be traded off against each other. In this example, the voltages and currents in the system are relatively high. One can adjust the tuning to lower the voltage and/or current at the receiver if the load is lower.

Estimation of Coupling Coefficient and Mutual Inductance

As explained above, the coupling coefficient, k, may be useful for a number of reasons. In one example, the coupling coefficient can be used to understand the arrangement of the coils relative to each other so tuning adjustments can be made to ensure adequate performance. If the receiver coil moves away from the transmitter coil, the mutual inductance will decrease, and ceteris paribus, less power will be transferred. In various embodiments, the system is configured to make tuning adjustments to compensate for the drop in coupling efficiency.

The exemplary system described above often has imperfect information. For various reasons as would be understood by one of skill in the art, the system does not collect data for all parameters. Moreover, because of the physical gap between coils and without an external means of communications between the two resonators, the transmitter may have information that the receiver does not have and vice versa. These limitations make it difficult to directly measure and derive the coupling coefficient, k, in real time.

Described below are several principles for estimating the coupling coefficient, k, for two coils of a given geometry. The approaches may make use of techniques such as Biot-Savart calculations or finite element methods. Certain assumptions and generalizations, based on how the coils interact in specific orientations, are made for the sake of simplicity of understanding. From an electric circuit point of view, all the physical geometry permutations can generally lead to the coupling coefficient.

Figure 2:
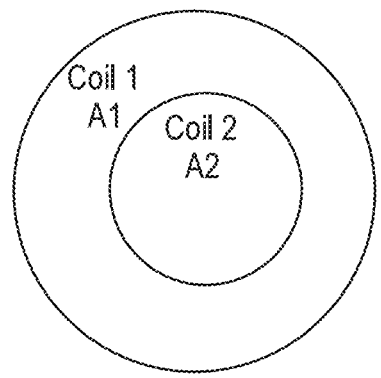
FIG. 2 illustrates the flux generated by a pair of coils.

If two coils are arranged so they are in the same plane, with one coil circumscribing the other, then the coupling coefficient can be estimated to be roughly proportional to the ratio of the area of the two coils. This assumes the flux generated by coil 1 is roughly uniform over the area it encloses as shown in FIG. 2.

Figure 3A:
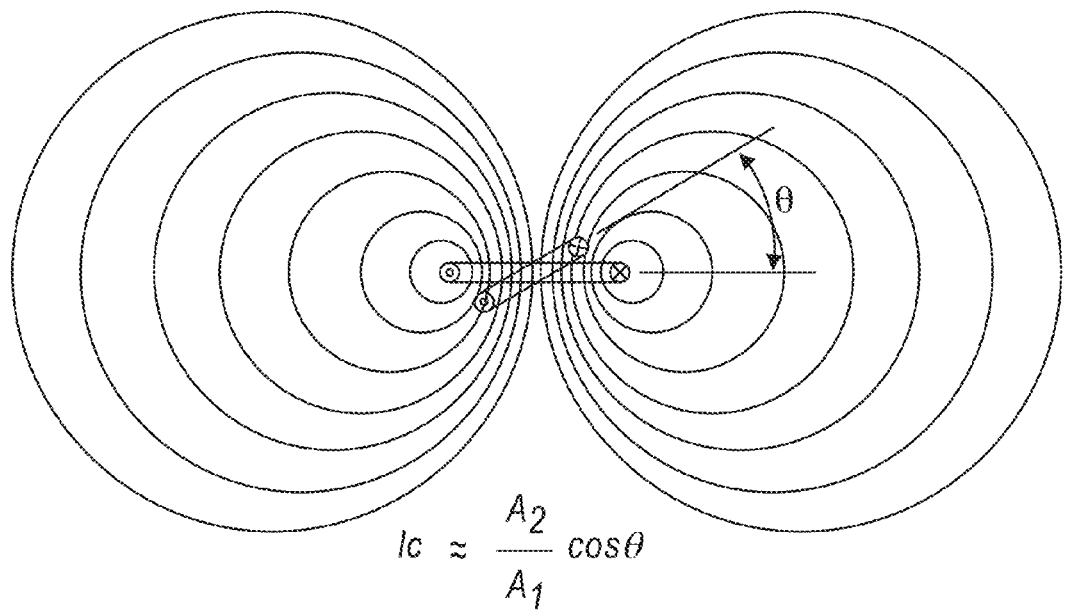
FIGS. 3A-3B illustrate the effect of coil alignment on the coupling coefficient.

If the coils are out of alignment such that the coils are at a relative angle, the coupling coefficient will decrease. The amount of the decrease is estimated to be about equal to the cosine of the angle as shown in FIG. 3A. If the coils are orthogonal to each other such that theta (θ) is 90 degrees, the flux will not be received by the receiver and the coupling coefficient will be zero.

Figure 3B:
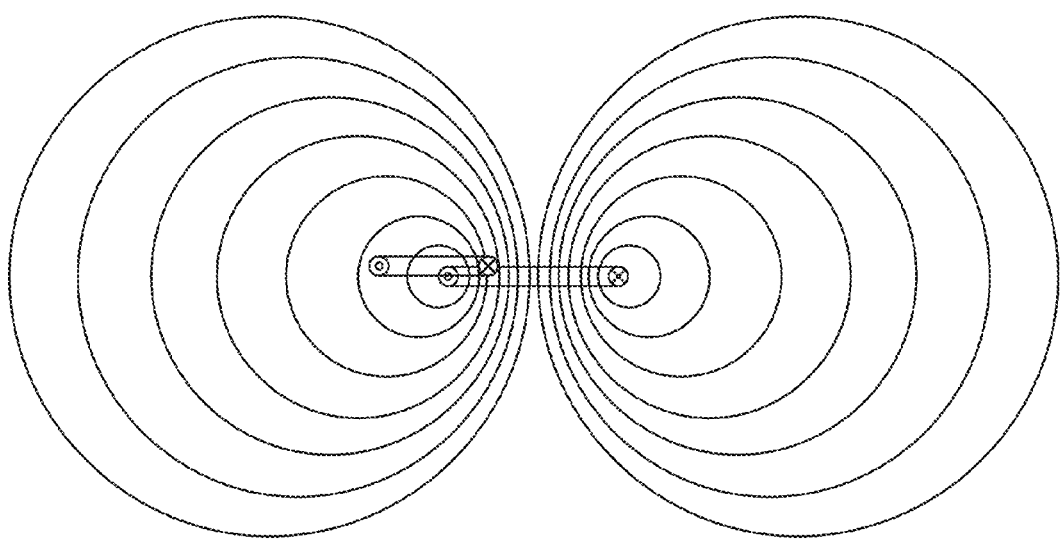

If the coils are arraigned such that half the flux from one coil is in one direction and the other half is in the other direction, the flux cancels out and the coupling coefficient is zero, as shown in FIG. 3B.

A final principle relies on symmetry of the coils. The coupling coefficient and mutual inductance from one coil to the other is assumed to be the same regardless of which coil is being energized.

$$M_{xy} = M_{yx}$$

Exemplary TET System

In a TET system, many factors must be considered when designing the implantable receiver components. In particular, the implanted components should be small and light enough to be implanted within the body, toxic and dangerous electrical and battery components should be isolated from the body, and the implant should be designed in a way to maximize its ability to receive wireless power from the transmitter while reducing or eliminating the generation of heat within the body. Various embodiments of a TET implant are described in this disclosure to address these factors. As used herein, TET system refers to the larger system including, for example, data communication and power storage. In one embodiment, the TET system includes two or more implants to house an internal power source, circuitry, and a data communication subsystem. The data communication system may include an antenna. The antenna may be housed in one of the implant housing, or the antenna may be attached to the outside of an implant housing. U.S. Pub. No. 2007/0142696, the entire contents of which are incorporated herein by reference for all purposes, shows and describes various configurations for housing the various system components in the body.

Figure 4:
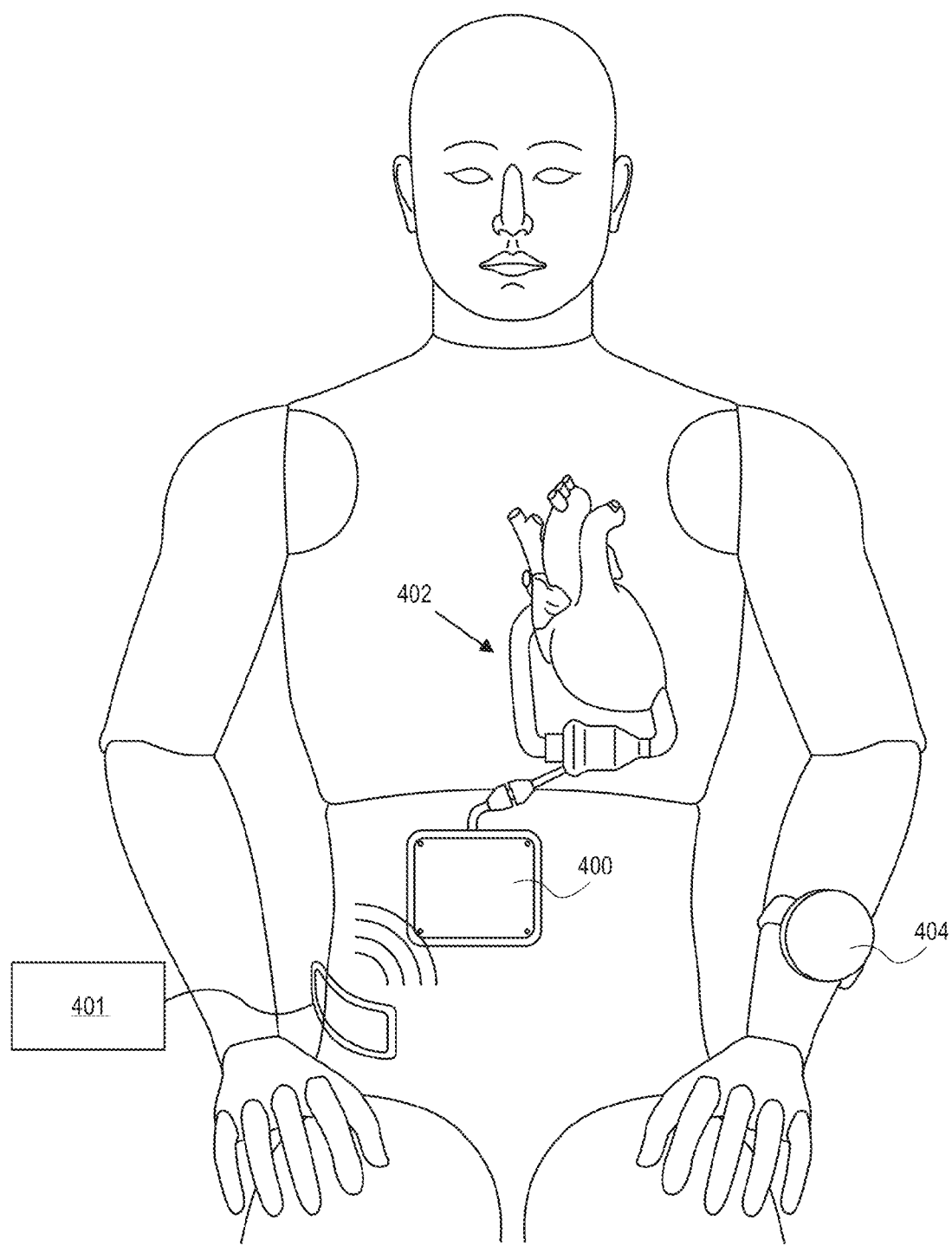
FIG. 4 illustrates an implantable TET receiver unit implanted in a human body.

FIG. 4 illustrates an implantable TETS receiver unit 400 implanted in an abdomen of a human patient. The receiver unit 400 can be coupled to a device load 402, such as an implantable medical device, e.g., an implantable LVAD or heart pump. The receiver unit 400 can include a receiver resonator coil and electronics configured to receive wireless energy from an external transmitter 401, which can include a power supply such as a pulse generator connected to a transmitter resonator coil. In some embodiments, external controller 404 can be configured to communicate with the TETS receiver 400 and can be worn by the patient, such as on the patient's wrist. In other embodiments, the external controller can be an electronic computing device such as a personal computer, a tablet, smartphone, or laptop computer. In one embodiment, the receiver unit 400 further includes an antenna along an outer periphery (shown, e.g., in FIG. 9C). In one embodiment, the receiver unit further includes an internal rechargeable power source (shown, e.g., in FIG. 6A). In various embodiments, the receiver unit 400 of the TET system is configured as a single implanted device including the receive coil, antenna, power source, and associated circuitry. The receiver unit is configured so the implantable medical device can be plugged directly into the unit. The single housing configuration makes implantation easier and faster. Additionally, since there are less implants, and consequently less tunneling in the body and percutaneous defect sites, adverse event risks like bleeding and infection are reduced.

Construction and design of one exemplary implantable TETS receiver unit will now be described. FIGS. 5A and 5B illustrate an internal housing 506 of a TETS receiver unit 500. The internal housing can be sized and configured to hermetically house the internal electrical components of the TETS receiver unit. In some embodiments, the internal housing 506 can comprise a metallic box, such as a titanium box. In some embodiments, the internal housing can comprise implantable ceramics and plastics. The internal housing of FIGS. 5A-5B is shown here without a top portion.

The internal housing can include openings 508 on at least one side of the housing to accommodate electronic feed-throughs for components connected to the receiver unit. In some embodiments, the feed-throughs can comprise an implantable medical device feed-through 510, a radio feed-through 512, and a TET feed-through 514. These feed-throughs can be used to connect the receiver unit to any number of electronic devices for the transfer of power and/or data to those devices. It should be understood that any number of openings 508 and feed-throughs can be incorporated into the housing, depending on the specific application or needs. The feed-throughs are shown as male connectors, but in other embodiments the feed-throughs can comprise female connectors, or other types of electrical connectors known in the art.

Figure 6B:
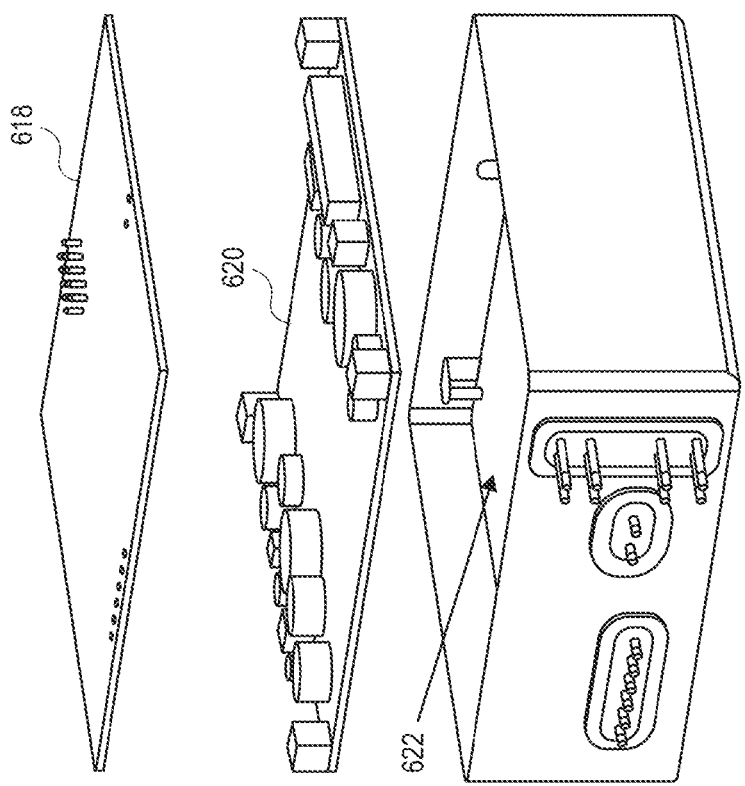
FIGS. 6A-6B illustrate the internal enclosure and electronic components of the TET receiver unit.
Figure 6A:
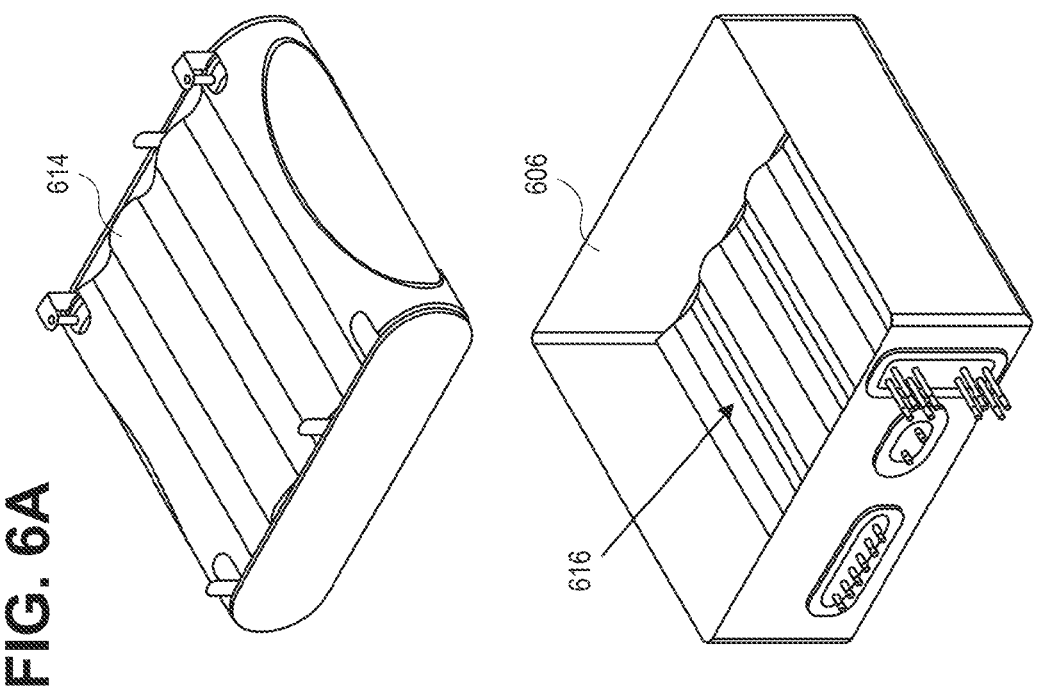

FIGS. 6A-6B show the remaining internal components of the TETS receiver unit that can be disposed within the internal housing of FIGS. 5A-5B. FIG. 6A illustrates an exploded view of internal housing 606, battery 614, and heat spreader 616. The heat spreader can be designed and configured to substantially conform to the battery 614 and to dissipate and eliminate heat generated by the battery. FIG. 6B illustrates the various printed circuit boards or electronics 618 and 620 that control operation of the implantable TETS receiver unit. In one embodiment, for example, electronics 618 can comprise a device control PCB configured to control a separate implanted medical device (e.g., device 402 from FIG. 4), and electronics 620 can comprise a TETS PCB configured to control operation of the TETS receiver unit (e.g., receiving power, storing power, charging the battery, communication with external devices, AC-DC conversion, etc.). In some embodiments, the TETS receiver unit can include an additional heat spreader 622 disposed on top of the battery and separating the battery from the other electronics. Additional heat spreaders (not shown) can be disposed on other surfaces of the internal housing, or on or around the electronics themselves.

FIGS. 7A-7C illustrate the final construction of the internal housing 706 of the TETS receiver unit, including housing top cover 724 and header assembly 726. The final product, as shown in FIG. 7C, can have the top cover 724 welded or sealed to the rest of the internal housing 706 to provide for a completely hermetic enclosure.

Referring now to FIGS. 8A and 8B, a clamshell ferrite enclosure 826 can be precisely engineered to closely fit around the internal housing 806, to prevent the passage of magnetic flux into or out of the internal housing. In some embodiments, the clamshell enclosure can comprise two halves 827a and 827b. In other embodiments, the enclosure can include more than two pieces, such as three, four, or more pieces. However, increasing the number of pieces that makeup the enclosure increases the number of gaps between the separate pieces, which can allow magnetic flux to pass the ferrite and induce current or heat in the internal enclosure or electronics. The ferrite enclosure can include an opening for a wire feed-through to connect to the resonator coil wires, as will be described below. In some embodiments, the ferrite enclosure can be machined from a single piece of ferrite, such as with a diamond blade cutter. In some embodiments, the individual walls of the ferrite enclosure can have a thickness of approximately 1 to approximately 3 mm. In other embodiments, the ferrite enclosure can be tiled together with several different flat pieces of ferrite material. The downside to the tiled approach, however, is that it is prone to more gaps in the enclosure which would allow magnetic flux to pass into the internal enclosure and electronics. An advantage of forming the ferrite layer of many members (e.g. tiles) is that it can be easier to manufacture and less susceptible to total failure. Ferrite is a brittle material. Therefore, it is generally easier to affix tiles to the housing than to slide a ferrite shell over the housing. Ferrite is also expensive so any reduction in scrap rate can translate to a meaningful reduction in costs.

In various embodiments, ferrite layer enclosure 826 is formed of two or more layers of ferrite. In one embodiment, a low frequency ferrite is formed over the titanium can of internal housing 806. A relatively high frequency ferrite is formed over the low frequency ferrite. In one embodiment, the low frequency ferrite is thicker than the high frequency ferrite. The combination of low frequency and high frequency ferrite materials enhances shielding across a wider spectrum of frequencies. In one example, it provides shielding at both the TETS operating frequency and RF operating frequency.

As also shown in FIGS. 8A-8B, the ferrite enclosure 826 can include a plurality of ferrite fins 829A and 829B protruding from the side of the enclosure. Although only two fins are shown in this embodiment, it should be understood that more complex receivers (with multiple coils including transmitter coils, receiver coils, and excitation coils) may require more ferrite fins. The function of the ferrite fins will be discussed below in reference to FIGS. 9A-9B.

Figure 8C:
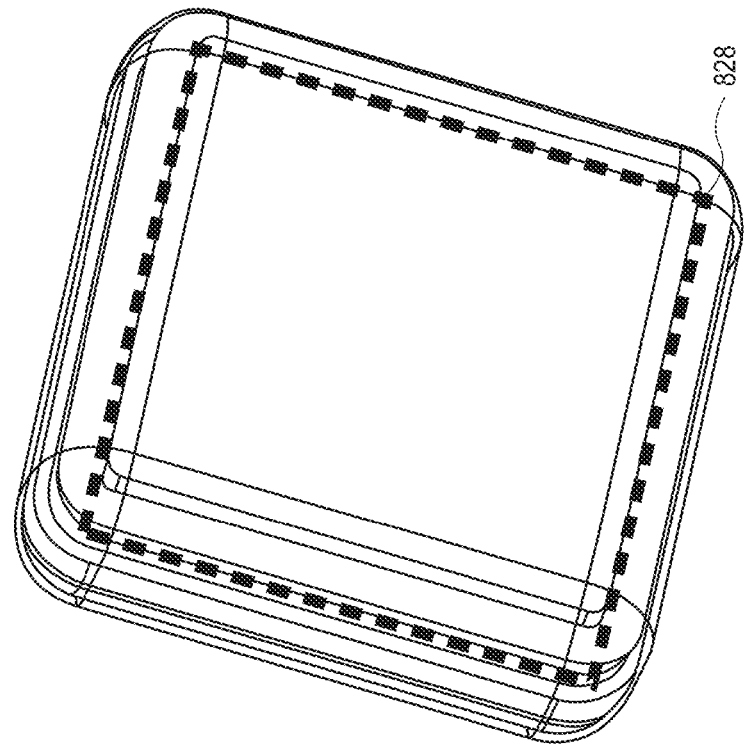
Figure 8D:
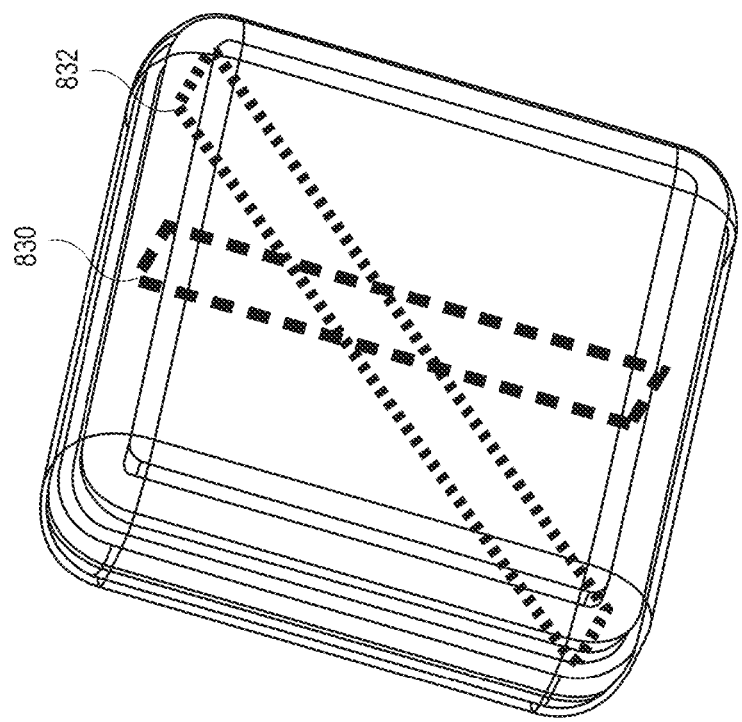

As shown in FIGS. 8A-8B, in this particular embodiment of the clamshell enclosure the top half 827a is fitted around the top half of the internal enclosure, and the bottom half 827b is fitted around the bottom half of the internal enclosure. The two halves meet along a plane that bisects the internal enclosure along the side portions of the enclosure, as represented by plane 828 in FIG. 8B. In other embodiments, however, the clamshell can be designed so as to meet along a plane that cuts through the top and bottom portions of the enclosure, such as long the planes represented by planes 830 or 832 in FIG. 8B. FIGS. 8C and 8D further illustrate the various gap sizes that result from the joining of differently shaped clamshell halves. More specifically, FIG. 8C shows the gap between ferrite halves along plane 828, which extends around the largest perimeter of the internal housing. In contrast, FIG. 8D shows the gaps created by ferrite halves when they join together along the (larger) top and bottom portions of the internal enclosure.

In the case of a titanium internal housing 806, the size of the gaps can become an issue because of titanium's relatively high resistivity (for a metal). The magnetic fields that enter these ferrite gaps can create a significant amount of heat when interacting with the titanium enclosure. Mathematically, as the ferrite gap increases to cover a larger surface area, the tolerance on the gap must be tighter to reduce the amount of induced heat below a safe and reasonable level. For example, if a maximum amount of heat allowed in the TETS receiver is 100 mW of heat, then the maximum allowable gap between the ferrite core halves in FIG. 8C would be approximately 14 μm. This gap can be increased to 28 μm by introducing a feature (such as a spacer) to the titanium enclosure to ensure that no titanium material is closer to the gap than 0.64 mm. In contrast, a gap that runs across the middle of each of the large sides, as shown in FIG. 8D, would induce no more than 10 mW of additional heat for a 127 μm (5 mil) gap between ferrite halves.

Figure 9C:
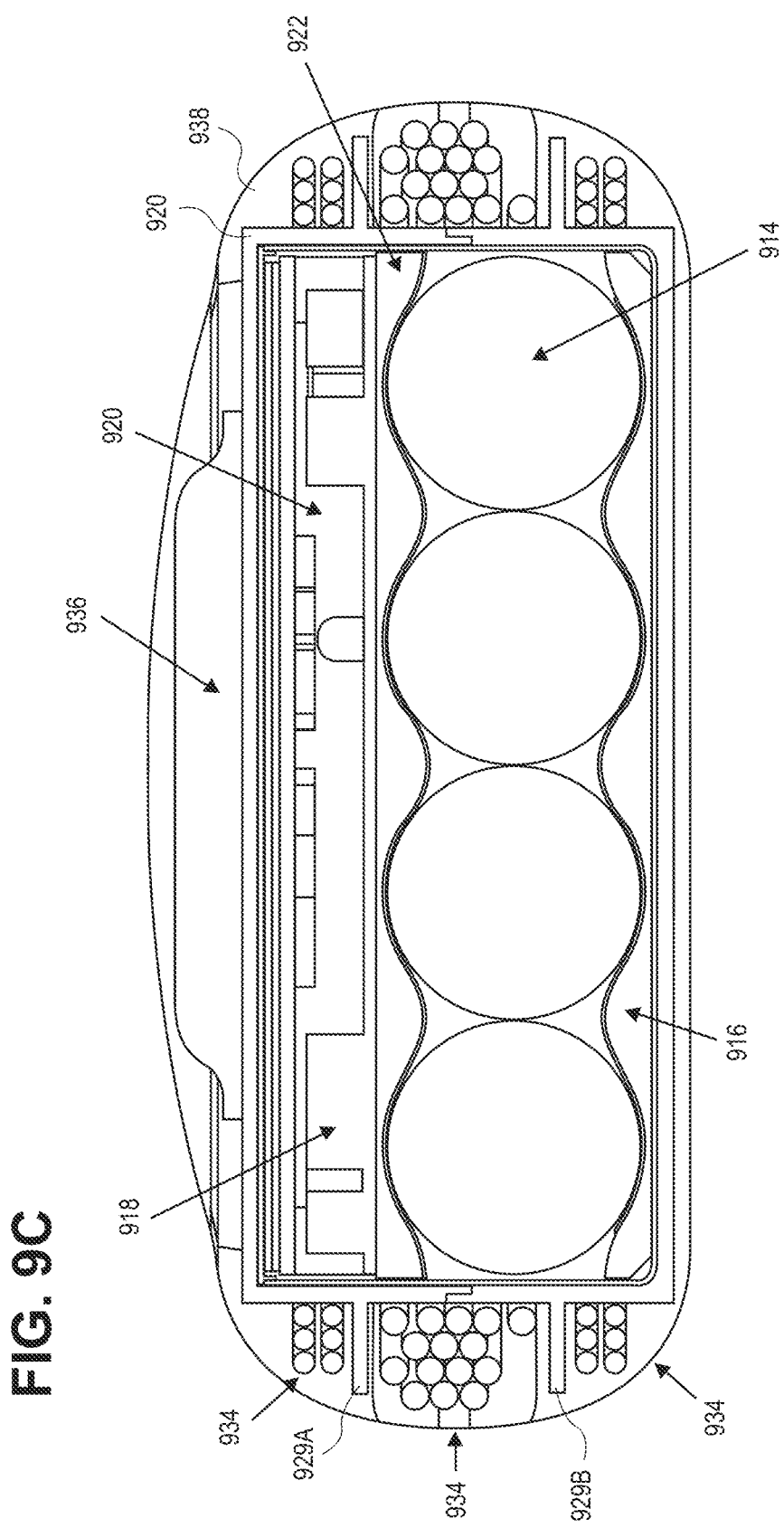

FIG. 9A shows the various resonator coils 934 wrapped around the ferrite enclosure. In this particular embodiment, the ferrite enclosure includes two ferrite fins, 929A and 929B, and three sets of resonator coils 934. The coils can be, for example, receive coils, exciter coils, and/or transmit coils configured to transmit and receive wireless energy. These coils can be electrically coupled to the internal electronics of the TETS receiver via the feed-through, partially illustrated here (and better shown in FIG. 8B). Also shown in FIGS. 9A-9B is optional communications antenna 936, which can be configured, for example, to communicate with an external device such as the external power transmitter or external controller. In one embodiment, communication can be achieved by modulating wireless power transfer signals during operation. In one embodiment, antenna 936 is a radiofrequency (RF) antenna. In FIG. 9B, the entire enclosure, including the resonator coils and the fins, can be surrounded and sealed with a material such as a polymer 938. In one embodiment, antenna 936 is formed by applying an antenna material directly on the ferrite housing material before encapsulating the enclosure with polymer. FIG. 9C illustrates a cross-sectional view of the TETS receiver, including all the features described above such as the internal enclosure 906, battery 914, heat spreaders 916 and 922, electronics 918 and 920, ferrite enclosure 926, ferrite fins 929A and 929B, resonator coils 934, antenna 936, and polymer 938.

Referring now to FIG. 10, the function of the exemplary ferrite fins will be discussed. In this particular embodiment, the ferrite enclosure can include three ferrite fins 1029A, 1029B, and 1029C extending from one or more sides of the enclosure, and two sets of wire coils, in this case resonator coil 1034A and exciter coil 1034A, positioned between the ferrite fins. Ferrite fin 1029A can be positioned toward the front of the receiver (i.e., situated between the transmitter coil and any coils on the receiver) and can increase the coupling between the transmitter and the receiver resonator coil. By increasing the coupling between the receiver and the transmitter, the front ferrite fin increases overall system efficiency. The ferrite fin can accomplish this by conducting some magnetic field (that would otherwise not be picked up by the resonator coil) to the ferrite cover so that it is picked up by the resonator coil. The width w of the ferrite fin 1029A can be determined from case to case; however, if the fin is too long, then it will end up shielding the resonator coil from the transmitter coil thereby reducing the coupling instead of increasing it.

Ferrite fin 1029B separates the receiver's resonator 1034A and exciter 1034b coils and can be configured to decrease the coupling between the resonator and exciter coils. The fin accomplishes this by conducting some magnetic field (that would otherwise be picked up by the exciter coil) away from the receiver, so that it is not picked up by the exciter. The width w of the fin 1029B can be relatively large compared to the width w of the other ferrite fins. To optimize the coupling between the resonator and exciter, the width must be determined from case to case; too large and the coupling may end up less than optimum. Another effect of the fin 1029B is that it also decouples the transmitter coil from the exciter coil.

The third ferrite fin 1029C can be configured to shield the receiver from influence by foreign objects behind the receiver. The width w of the fin 1029c can also be relatively large compared to the width of the first ferrite fin.

All three types of ferrite fins can be configured to increase the self inductance of the coil they are next to. This can be beneficial because it reduces the required number of turns of those coils, saving weight and also increasing the coil's quality factor Q (i.e., increasing the ratio of inductance to resistance).

One possible disadvantage of using fins is that it makes the design of a reversible receiver (one that can have the same transmitter oriented on either side of it) more difficult. First off, a reversible receiver cannot use a wide rear fin 1029c, because the fin becomes a pick-up fin when the transmitter is located on the same side. Second, use of a wide central fin 1029b may decouple the receiver's resonator coil from the transmitter, lowering overall system efficiency. To prevent this, the resonator can be split into two halves, with the exciter in between and using two decoupler fins, but this comes at a cost of reduced Q for the resonator. Another possibility is to split the exciter into two halves, with the resonator in between, using two central fins, and reduce the width of the central fins. This lowers Q of the exciter, but can be a good solution for a reversible receiver. Note that if the transmitter on the back side of the receiver is of a different type (e.g., a large stationary coil under a bed), it may be the case that the receiver does not have to be made reversible. The design of the receiver may therefore depend on the design requirements and desired amount of flexibility for the implanting physician.

There can be a small gap between each fin and the ferrite cover without causing any heating (this is not an issue for these particular gaps), although they should be kept reasonably small (about 100 microns or less) to avoid too much loss of the intended function of the fins.

Figure 11A:
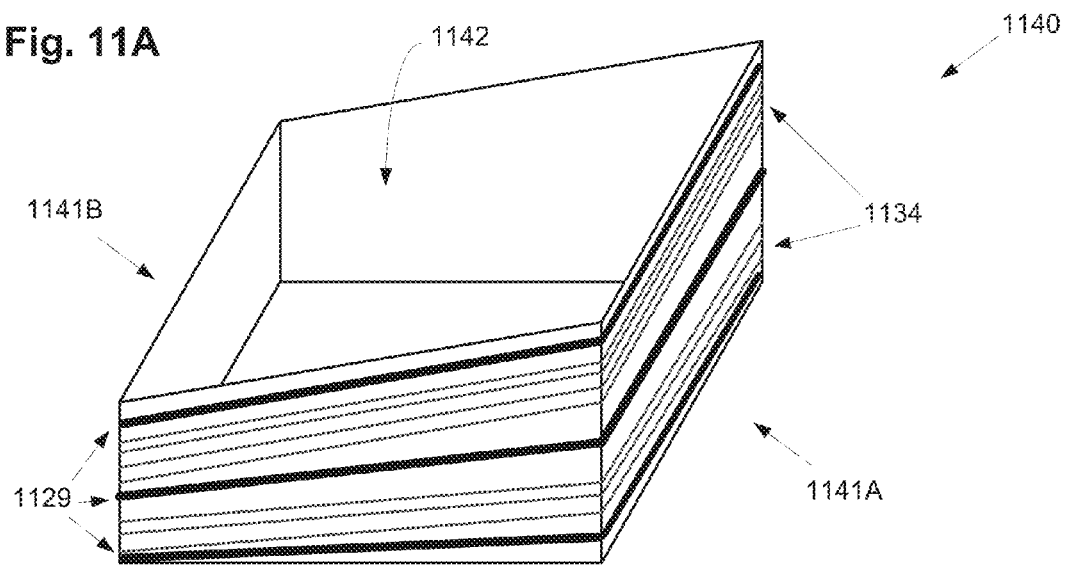
FIGS. 11A-11C illustrate another embodiment of a TET receiver unit.
Figure 11B:
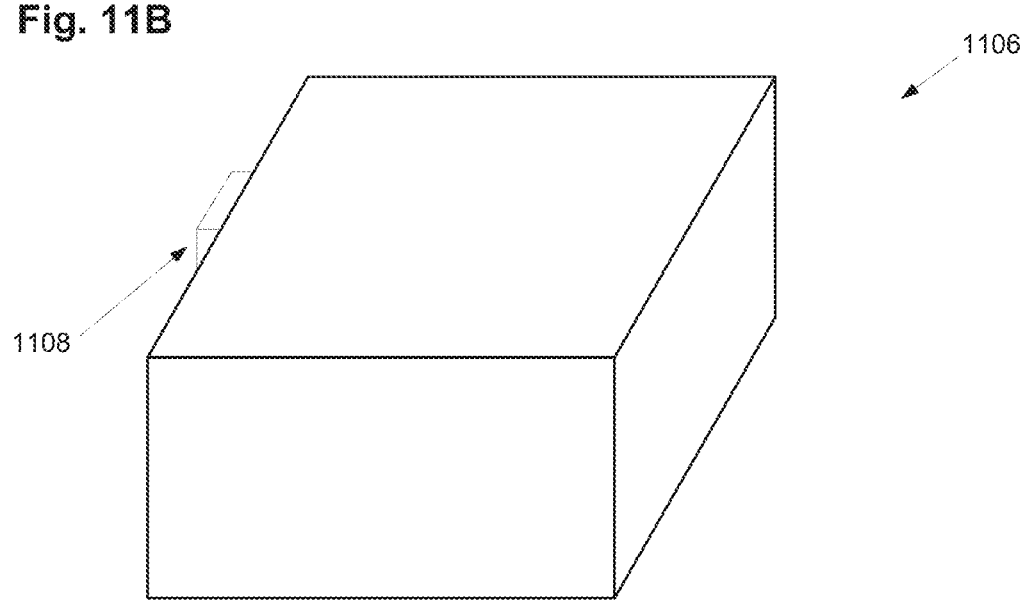
Figure 11C:
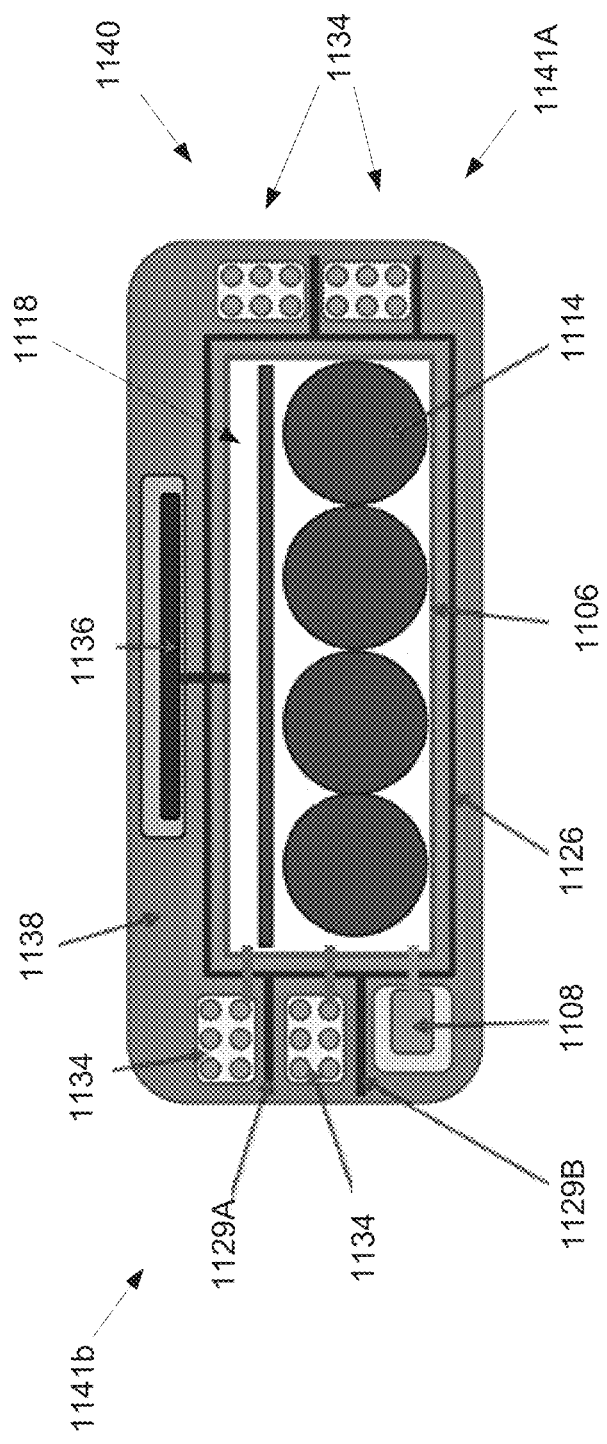

FIGS. 11A-11C illustrate another embodiment of a TETS receiver unit, including a coil structure which is separately formed from the internal housing and electronics components. FIG. 11A shows coil structure 1140, and FIG. 11B shows internal housing 1106. Internal housing 1106 of FIG. 11B can be comparable to the internal housings described above and shown in FIGS. 5A-5B, 6A-6B, 7A-7C, 8A-8D, and 9C. The internal housing 1106 can also contain all the structures described above, including the battery, electronics, heat spreaders, etc. The internal housing can also include one or more feed-throughs 1108, such as those described above, to allow for an electrical connection to the electrical components within the housing.

Coil structure 1140 of FIG. 11A can comprise an outer shell with a hollow middle 1142, and can be sized and configured to slide over the internal housing 1106 of FIG. 11B. The coil structure 1140 can include one or more resonator coils 1134, such as transmitter resonator coils, receiver resonator coils, and/or exciter resonator coils similar to the coil structure described above with reference to FIGS. 9A-9C.

Also shown in FIG. 11A, the coil structure 1140 can include one or more ferrite strips 1129 disposed on either side of the coil resonators. The ferrite strips can comprise a ferrite material and can provide the same shielding benefits of the ferrite fins described above. In the exemplary embodiment, the ferrite strips 1129 are dimensioned and configured similar to fins 1029A, 1029B, and 1029C described above. Although described as ferrite strips, one will appreciate from the description herein that other materials and configurations may be used. Any number of materials with suitable magnetic resistivity properties can be used. The strips can be configured as fins, wires, beads, ribs, and more.

The entire coil structure 1140 can comprise a plastic, polyurethane, epoxy, or similar material to enclose the coil resonators and the ferrite strips. The coil structure can be sized and configured to provide a snug and tight fit around the internal housing of FIG. 11B when placed over the housing. The structure can also be configured to allow for a loose fit or gap between the coil structure and internal housing. As should be understood, an electrical connection can be made between the housing and the coil structure through the feed-through(s) 1108 of the internal housing.

The method of making the implanted system will now be described. The coil structure 1140 is formed by winding wires around ferrite strips 1129. The assembled coil unit is then overmolded with epoxy to hold it together and form coil structure 1140. The internal housing 1106 is formed in a manner as described above. The internal housing 1106 is then inserted into the middle 1142 of the coil structure 1140. Thereafter the housing 1106 assembled with the coil structure 1140 is processed similar to above. The coil structure is electrically connected to the internal housing. The whole structure is formed together, for example, by overmolding with a polymer. An antenna such as antenna 936 (shown in FIG. 9C) and other components can then be attached or formed on the unit.

As shown in FIGS. 11A-11B, in some embodiments the internal housing and/or coil structure can include a trapezoidal shape, wherein one side of the housing/structure is taller than the other side. For example, the coil structure 1140 of FIG. 11A includes a first side 1141*a* that is taller than a second side 1141*b*. This is in contrast to the generally rectangular or box-shaped structures described above in other embodiments. The trapezoidal shape reflects the internal components in housing 1106 and bulkhead connectors. As can be seen in FIG. 7A, one side of the housing serves as a bulkhead with connectors. The opposing side does not have any connectors. Accordingly, the internal housing 1106 in FIG. 11B includes a feed-through 1108 on one side of the housing. The trapezoidal shape of the coil structure in FIG. 11A can surround the internal housing without interfering with the feed-through 1108 of the housing.

FIG. 11C is a cross-sectional view of the coil structure 1140 and internal housing 1106 of FIGS. 11A-B. In this figures, the coil structure is shown surrounding the internal housing 1106. FIG. 11C shows the other components of the receiver unit, including feed-through 1108, battery 1114, electronics 1118, ferrite enclosure 1126, ferrite fins 1129A and 1129B, coils 1134, antenna 1136, and polymer 1138. FIG. 11C shows how side 1141A of coil structure 1140 is taller than side 1141B of the coil structure. It can be seen how this accommodates the position of the feed-through 1108 on the side of the internal housing 1106. In this particular embodiment, the coil windings on the 1141A side can be "stacked" vertically 3 times (and horizontally 2 times), for a total of 6 windings in each coil, while the coil windings on the 1141B side can be "stacked" vertically only 2 times (and horizontally 3 times) maintaining the same coil count. This technique of coil winding can be used to adjust a height of a coil on one or more sides of a coil structure, as shown.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. Various modifications to the above embodiments will be readily apparent to those skilled in the art, and the generic principles defined herein may be applied to other embodiments without departing from the spirit or scope of the invention. Thus, it is intended that the scope of the present invention herein disclosed should not be limited by the particular disclosed embodiments described above, but should be determined only by a fair reading of the claims that follow.

In particular, materials and manufacturing techniques may be employed as within the level of those with skill in the relevant art. Furthermore, reference to a singular item, includes the possibility that there are plural of the same items present. More specifically, as used herein and in the appended claims, the singular forms "a," "and," "said," and "the" include plural referents unless the context clearly dictates otherwise. As used herein, unless explicitly stated otherwise, the term "or" is inclusive of all presented alternatives, and means essentially the same as the commonly used phrase "and/or." It is further noted that the claims may be drafted to exclude any optional element. As such, this statement is intended to serve as antecedent basis for use of such exclusive terminology as "solely," "only" and the like in connection with the recitation of claim elements, or use of a "negative" limitation. Unless defined otherwise herein, all technical and scientific terms used herein have the same meaning as commonly understood by one of ordinary skill in the art to which this invention belongs.

What is claimed is:

1. An implantable TET receiver unit, comprising:
   an internal housing;
   an energy source disposed in the internal housing;
   a controller disposed in the internal housing, the controller configured to control operation of the TET receiver;
   a ferrite housing disposed around the internal housing, the ferrite housing configured to reduce an amount of magnetic flux that reaches the internal housing; and
   at least one wire coil wrapped around the ferrite housing and electrically coupled to the controller, the at least one wire coil configured to receive wireless energy from an external power transmitter.

2. The TET receiver unit of claim 1, wherein the ferrite housing comprises two ferrite halves machined out of solid pieces of ferrite.

3. The TET receiver unit of claim 1, wherein the ferrite housing comprises a plurality of ferrite tiles.

4. The TET receiver unit of claim 1, further comprising at least one ferrite fin extending from the ferrite housing and positioned next to the at least one wire coil.

5. The TET receiver unit of claim 4, wherein the at least one ferrite fin extends around at least a portion of a perimeter of the ferrite enclosure.

6. The TET receiver unit of claim 4, wherein the at least one ferrite fin extends around a perimeter of the ferrite enclosure.

7. The TET receiver unit of claim 1, wherein the at least one wire coil further comprises at least one exciter coil and at least one resonator coil.

8. The TET receiver unit of claim 6, further comprising a first ferrite fin extending from the ferrite enclosure and positioned between the at least one resonator coil and an external wireless power transmitter, and second ferrite fin extending from the ferrite enclosure and positioned between the resonator coil and the exciter coil, and a third ferrite fin extending from the ferrite enclosure and positioned on an opposite side of the exciter coil from the second ferrite fin.

9. The TET receiver unit of claim 4, wherein the at least one ferrite fin is configured to increase a coupling between the at least one wire coil and an external wireless power transmitter.

10. The TET receiver unit of claim 4, wherein the at least one ferrite fin is configured to decrease a coupling between a resonator coil and an exciter coil of the at least one wire coil.

11. The TET receiver unit of claim 1, wherein a ferrite gap between the ferrite housing occurs along small sides of the internal housing.

12. The TET receiver unit of claim 1, wherein a ferrite gap between the ferrite housing occurs along large sides of the internal housing.

13. A system for wireless energy transfer, comprising:
   a transmitter unit comprising a transmitter resonator coil coupled to a power supply and configured to transmit wireless energy; and
   a receiver unit comprising an internal housing, an energy source disposed in the internal housing, a controller disposed in the internal housing, the controller configured to control operation of the TET receiver, a ferrite housing disposed around the internal housing, the ferrite housing configured to reduce an amount of magnetic flux that reaches the internal housing, and at least one wire coil wrapped around the ferrite housing and electrically coupled to the controller, the at least one wire coil configured to receive wireless energy from the transmitter unit.

14. The system of claim 13, further comprising at least one ferrite fin extending from the ferrite housing and positioned next to the at least one wire coil.

15. The system of claim 14, wherein the at least one ferrite fin extends around a perimeter of the ferrite enclosure.

16. The system of claim 13, wherein the at least one wire coil further comprises at least one exciter coil and at least one resonator coil.

17. The system of claim 14, wherein the at least one ferrite fin is configured to increase a coupling between the at least one wire coil and the transmitter unit.

18. The system of claim 14, wherein the at least one ferrite fin is configured to decrease a coupling between a resonator coil and an exciter coil of the at least one wire coil.

19. An implantable TET receiver unit, comprising:
an internal housing;
an energy source disposed in the internal housing;
a controller disposed in the internal housing, the controller configured to control operation of the TET receiver; and
a coil structure sized and configured to be placed around the internal housing, the coil structure including at least one wire coil configured to receive wireless energy from an external power transmitter, the coil structure further including at least one ferrite strip disposed near the at least one wire coil and configured to increase a coupling between the at least one coil structure and the external power transmitter.

20. A method of transmitting and receiving wireless energy, comprising:
transmitting wireless energy from a transmitter coil into a patient;
receiving the wireless energy with a wire coil of a receiver unit implanted in the patient, the wire coil wrapped around a ferrite enclosure that houses electronics of the receiver unit; and
preventing magnetic flux from interfering with the electronics of the receiver unit with the ferrite enclosure.

21. A method of transmitting and receiving wireless energy, comprising:
transmitting wireless energy from a transmitter coil into a patient;
receiving the wireless energy with a wire coil of a receiver unit implanted in the patient, the wire coil wrapped around a ferrite enclosure that houses electronics of the receiver unit; and
increasing a coupling between the transmitter coil and the receiver unit with a ferrite fin of the ferrite enclosure that is disposed near the wire coil.

22. The TET receiver unit of claim 1, further comprising an integrated antenna disposed on or near the internal housing and electrically coupled to the controller.

23. The TET receiver unit of claim 22, wherein the integrated antenna is formed on a wall of the ferrite housing.

24. The TET receiver unit of claim 23, further comprising a polymer encapsulating the ferrite housing, the internal housing, and the integrated antenna.

* * * * *